US012430663B2

(12) United States Patent
Doumar

(10) Patent No.: US 12,430,663 B2
(45) Date of Patent: *Sep. 30, 2025

(54) SYSTEM AND METHOD FOR OMNICHANNEL TEXT-BASED COMMUNICATION UTILIZING ADAPTIVE INSTRUCTIONS

(71) Applicant: TapText llc, Coral Springs, FL (US)

(72) Inventor: Steve Doumar, Fort Lauderdale, FL (US)

(73) Assignee: TAPTEXT LLC, Coral Springs, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/069,215

(22) Filed: Dec. 20, 2022

(65) Prior Publication Data

US 2023/0206267 A1    Jun. 29, 2023

Related U.S. Application Data

(63) Continuation-in-part of application No. 17/711,995, filed on Apr. 1, 2022, which is a continuation of
(Continued)

(51) Int. Cl.
*G06K 19/06* (2006.01)
*G06F 16/955* (2019.01)
(Continued)

(52) U.S. Cl.
CPC ..... *G06Q 30/0207* (2013.01); *G06F 16/9554* (2019.01); *G06F 16/9558* (2019.01);
(Continued)

(58) Field of Classification Search
CPC ......... G06Q 30/0207; G06Q 10/06315; G06Q 30/016; G06Q 30/0201; G06Q 30/0267;
(Continued)

(56) References Cited

U.S. PATENT DOCUMENTS 6,134,530 A     10/2000  Bunting et al.
6,549,625 B1 *   4/2003  Rautila ................. H04L 67/51
                                                    380/258
(Continued)

FOREIGN PATENT DOCUMENTS

WO     2008131176 A2    10/2008
WO     2019118469 A2     6/2019

*Primary Examiner* — Richard G Keehn
(74) *Attorney, Agent, or Firm* — Galvin Patent Law LLC; Brian R Galvin

(57) ABSTRACT

A system and method for omnichannel text-based communication using adaptive instructions. The system is a cloud-based network containing a campaign database, an analytics database, an adaptive advertisement management, a short message service server with automated response capabilities, and user mobile and compute devices that transmit a vehicle description page associated with an advertisement campaign embedded with a communication initiator for display on a customer computing device. Taken together or in part, said system optimizes advertising campaigns across multiple platforms, provides strong analytics for all advertising types while allowing users to engage with advertising quickly and in a real-time automated fashion.

16 Claims, 16 Drawing Sheets

Related U.S. Application Data application No. 17/351,321, filed on Jun. 18, 2021, now Pat. No. 11,201,965, which is a continuation of application No. 17/349,659, filed on Jun. 16, 2021, now Pat. No. 11,488,188, which is a continuation of application No. 17/348,660, filed on Jun. 15, 2021, now Pat. No. 11,232,471, which is a continuation of application No. 17/344,695, filed on Jun. 10, 2021, now Pat. No. 11,354,691, which is a continuation of application No. 17/229,251, filed on Apr. 13, 2021, now abandoned, which is a continuation-in-part of application No. 17/209,474, filed on Mar. 23, 2021, now Pat. No. 11,599,916, which is a continuation-in-part of application No. 17/208,059, filed on Mar. 22, 2021, now Pat. No. 11,562,407, which is a continuation-in-part of application No. 17/191,977, filed on Mar. 4, 2021, now abandoned, application No. 18/069,215 is a continuation-in-part of application No. 17/190,260, filed on Mar. 2, 2021, now Pat. No. 11,532,020, which is a continuation-in-part of application No. 17/153,426, filed on Jan. 20, 2021, now abandoned.

(60) Provisional application No. 63/166,391, filed on Mar. 26, 2021, provisional application No. 63/154,357, filed on Feb. 26, 2021, provisional application No. 63/040,610, filed on Jun. 18, 2020, provisional application No. 63/025,287, filed on May 15, 2020, provisional application No. 63/022,190, filed on May 8, 2020, provisional application No. 62/994,219, filed on Mar. 24, 2020, provisional application No. 62/965,626, filed on Jan. 24, 2020, provisional application No. 62/963,368, filed on Jan. 20, 2020, provisional application No. 62/963,379, filed on Jan. 20, 2020.

(51) Int. Cl.
| | | |
|---|---|---|
| *G06F 21/32* | (2013.01) | |
| *G06F 21/62* | (2013.01) | |
| *G06K 7/14* | (2006.01) | |
| *G06N 20/00* | (2019.01) | |
| *G06Q 10/0631* | (2023.01) | |
| *G06Q 30/016* | (2023.01) | |
| *G06Q 30/0201* | (2023.01) | |
| *G06Q 30/0207* | (2023.01) | |
| *G06Q 30/0251* | (2023.01) | |
| *H04M 3/523* | (2006.01) | |
| *H04M 3/527* | (2006.01) | |
| *H04M 3/533* | (2006.01) | |

(52) U.S. Cl.
CPC .......... *G06F 21/32* (2013.01); *G06F 21/6245* (2013.01); *G06K 7/1417* (2013.01); *G06K 19/06037* (2013.01); *G06N 20/00* (2019.01); *G06Q 10/06315* (2013.01); *G06Q 30/016* (2013.01); *G06Q 30/0201* (2013.01); *H04M 3/523* (2013.01); *H04M 3/527* (2013.01); *H04M 3/53308* (2013.01); *H04M 3/53333* (2013.01); *G06F 2221/2139* (2013.01); *G06Q 30/0267* (2013.01)

(58) Field of Classification Search
CPC .. G06F 16/9558; G06F 16/9554; G06F 21/32; G06F 21/6245; G06F 2221/2139; G06N 20/00; G06K 7/1417; G06K 19/06037; H04M 3/523; H04M 3/527; H04M 3/53308; H04M 3/53333
See application file for complete search history.

(56) References Cited

U.S. PATENT DOCUMENTS

| | | | |
|---|---|---|---|
| 8,301,125 B2 | 10/2012 | Ramer et al. | |
| 8,510,773 B1* | 8/2013 | Abou-Rizk | G06Q 30/0251 725/35 |
| 8,521,581 B2 | 8/2013 | Belwadi et al. | |
| 8,532,283 B1 | 9/2013 | Haggerty et al. | |
| 10,027,609 B2 | 7/2018 | Hertz et al. | |
| 11,055,736 B2* | 7/2021 | Doumar | G06Q 30/0267 |
| 2008/0262929 A1 | 10/2008 | Behr | |
| 2009/0076917 A1* | 3/2009 | Jablokov | G06Q 30/02 705/14.39 |
| 2010/0094703 A1* | 4/2010 | Bramley | H04M 1/72427 715/823 |
| 2010/0138295 A1* | 6/2010 | Caron | G06Q 30/0251 715/835 |
| 2011/0055309 A1 | 3/2011 | Gibor et al. | |
| 2011/0225047 A1 | 9/2011 | Breed et al. | |
| 2012/0041825 A1* | 2/2012 | Kasargod | G06Q 30/02 705/14.68 |
| 2012/0192227 A1* | 7/2012 | Fleischman | H04N 21/2407 725/34 |
| 2012/0303445 A1* | 11/2012 | Jablokov | G06Q 30/02 705/14.42 |
| 2013/0018896 A1* | 1/2013 | Fleischman | G06F 16/40 707/748 |
| 2013/0066987 A1* | 3/2013 | Levinson | G06Q 10/10 709/206 |
| 2013/0073336 A1* | 3/2013 | Heath | G06Q 30/02 705/7.29 |
| 2013/0073377 A1* | 3/2013 | Heath | G06Q 30/02 705/14.39 |
| 2013/0073388 A1* | 3/2013 | Heath | G06Q 50/01 705/14.53 |
| 2013/0089848 A1 | 4/2013 | Exeter et al. | |
| 2013/0210469 A1 | 8/2013 | Smith | |
| 2013/0226995 A1* | 8/2013 | Etheredge | G06Q 30/02 709/203 |
| 2013/0275890 A1* | 10/2013 | Caron | G06F 3/04817 715/760 |
| 2013/0282458 A1* | 10/2013 | Roberts | G06Q 30/0217 705/14.19 |
| 2013/0282844 A1 | 10/2013 | Logan et al. | |
| 2013/0301820 A1 | 11/2013 | Williams et al. | |
| 2014/0006129 A1* | 1/2014 | Heath | G06Q 30/02 705/14.23 |
| 2014/0119531 A1 | 5/2014 | Tuchman et al. | |
| 2014/0279050 A1* | 9/2014 | Makar | G06F 16/9535 705/14.66 |
| 2015/0178784 A1* | 6/2015 | Oliver | G06Q 30/0267 705/14.64 |
| 2015/0201077 A1 | 7/2015 | Konig et al. | |
| 2015/0379574 A1* | 12/2015 | Pattan | G06Q 30/0261 705/14.58 |
| 2016/0042342 A1* | 2/2016 | Proctor, Jr. | G06Q 20/123 705/44 |
| 2016/0098755 A1* | 4/2016 | Silvestro | G06Q 30/0258 705/14.58 |
| 2016/0182720 A1 | 6/2016 | Kaiser et al. | |
| 2016/0189174 A1* | 6/2016 | Heath | G06Q 30/0201 705/7.29 |
| 2017/0003137 A1* | 1/2017 | Scofield | G01C 21/3691 |
| 2017/0180284 A1 | 6/2017 | Smullen et al. | |
| 2017/0270574 A1 | 9/2017 | Hessurg | |
| 2017/0308926 A1 | 10/2017 | Wofford et al. | |
| 2018/0060914 A1 | 3/2018 | Conrad et al. | |
| 2018/0211718 A1* | 7/2018 | Heath | G16H 80/00 |
| 2018/0212904 A1 | 7/2018 | Smullen et al. | |
| 2018/0357680 A1 | 12/2018 | Singh et al. | |
| 2020/0014642 A1 | 1/2020 | Sidi et al. | |

(56) References Cited

U.S. PATENT DOCUMENTS

| | | | |
|---|---|---|---|
| 2021/0011967 A1* | 1/2021 | Rathod | G06F 16/9535 |
| 2021/0035156 A1* | 2/2021 | Doumar | G06Q 30/0246 |
| 2021/0042784 A1* | 2/2021 | Doumar | G06Q 30/0244 |
| 2021/0224858 A1 | 7/2021 | Khoury et al. | |
| 2022/0150210 A1 | 5/2022 | Agarwal et al. | |

* cited by examiner

SYSTEM AND METHOD FOR OMNICHANNEL TEXT-BASED COMMUNICATION UTILIZING ADAPTIVE INSTRUCTIONS

CROSS-REFERENCE TO RELATED APPLICATIONS

Priority is claimed in the application data sheet to the following patents or patent applications, each of which is expressly incorporated herein by reference in its entirety:
Ser. No. 17/344,695
Ser. No. 17/229,251
63/166,391
Ser. No. 17/209,474
Ser. No. 17/208,059
Ser. No. 17/191,977
Ser. No. 17/190,260
Ser. No. 17/153,426
62/965,626
62/963,368
62/963,379
63/040,610
63/025,287
63/022,190
62/994,219
63/154,357

BACKGROUND

Field of the Art

The disclosure relates to the field of marketing, and more particularly to the field of automated management and optimization of advertising, chatbots, and sales.

Discussion of the State of the Art

Certain industries such as automotive sales rely heavily on remote communication leads. These communications can be email, webchats, and phone calls. However, due to the nature of staffing and current business practices, handling of these leads is typically done by the first person to answer the phone, or respond to an email. It is not always handled by the most desired sales agent and furthermore, transitioning clients between agents is still very much a manual process.

What is needed is a system and method for optimized omnichannel customer interaction utilizing text-based communication resulting in short- and long-term business competitive advantage and viability.

SUMMARY

Accordingly, the inventor has conceived, and reduced to practice, a system and method for omnichannel text-based communication using adaptive instructions. The system is a cloud-based network containing a campaign database, an analytics database, an adaptive advertisement management, a short message service server with automated response capabilities, and user mobile and compute devices that transmit a vehicle description page associated with an advertisement campaign embedded with a communication initiator for display on a customer computing device. Taken together or in part, said system optimizes advertising campaigns across multiple platforms, provides strong analytics for all advertising types while allowing users to engage with advertising quickly and in a real-time automated fashion.

According to a first preferred embodiment, a system for real-time omnichannel interaction, comprising: an omnichannel text-based communicator comprising a first plurality of programming instructions stored in a memory of, and operating on a processor of, a first computing device, wherein the first programming instructions, when operating on the processor, cause the first computing device to: receive a product identifier from a customer computing device; generate a tap text link associated with the product, the tap text link comprising a ready-to-send text message directed to a phone number associated with the advertisement campaign; send the generated tap text link to the customer computing device; receive a text message from the customer computing device, the text message corresponding to the tap text link; and send a multimedia message comprising an active call-to-action component comprising activation metadata to the customer computing device, is disclosed.

According to a second preferred embodiment, a method for real-time omnichannel interaction, comprising the steps of: receiving a product identifier from a customer computing device; generating a tap text link associated with the product, the tap text link comprising a ready-to-send text message directed to a phone number associated with the advertisement campaign; sending the generated tap text link to the customer computing device; receiving a text message from the customer computing device, the text message corresponding to the tap text link; and sending a multimedia message comprising an active call-to-action component comprising activation metadata to the customer computing device, is disclosed.

BRIEF DESCRIPTION OF THE DRAWINGS

The accompanying drawings illustrate several aspects and, together with the description, serve to explain the principles of the disclosed embodiments. It will be appreciated by one skilled in the art that the particular arrangements illustrated in the drawings are merely exemplary, and are not to be considered as limiting of the scope of the claims herein in any way.

DETAILED DESCRIPTION

Figure 1:
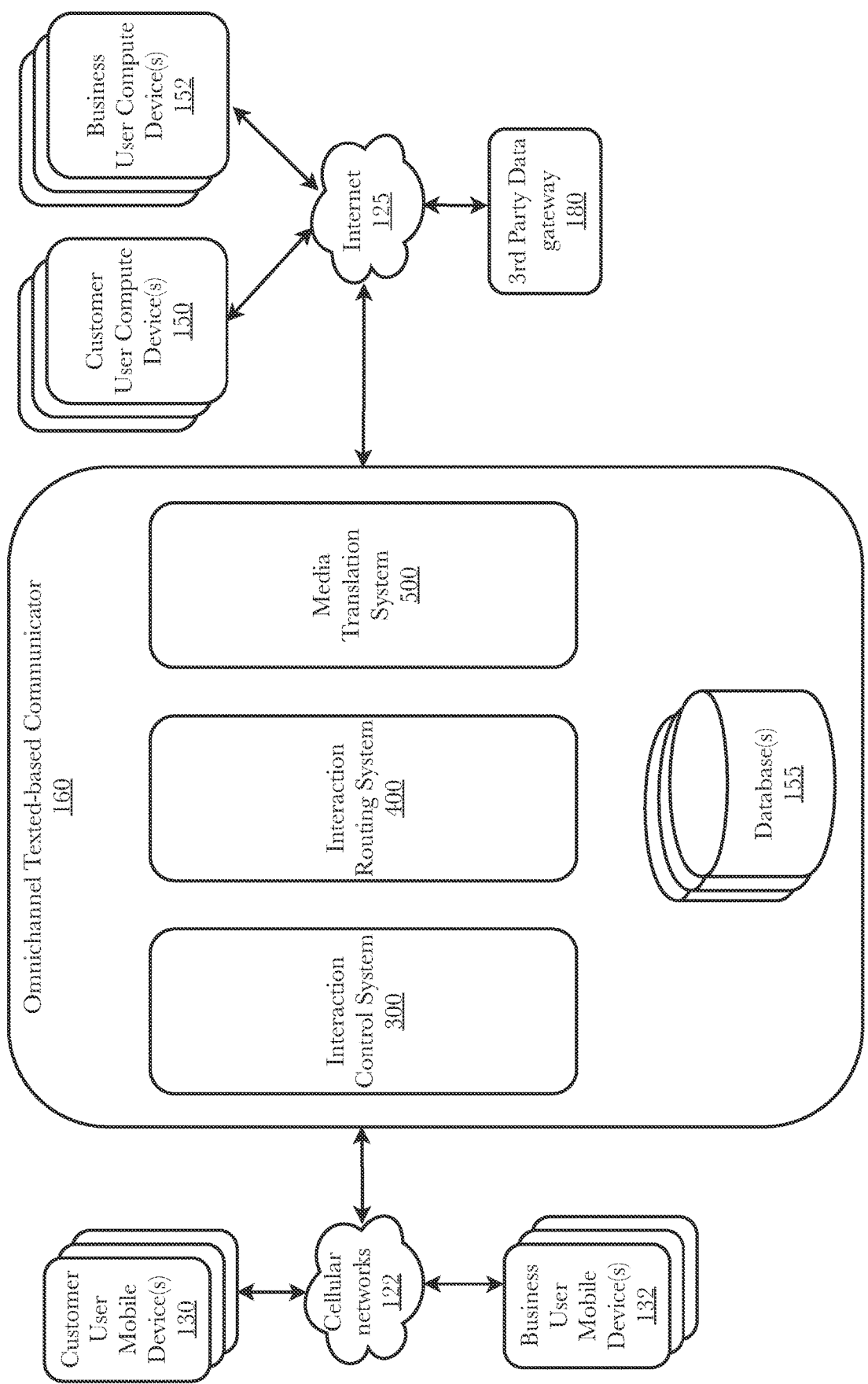
FIG. 1 is a system diagram of an omni-channel text-based communicator platform with TCPA compliant mobile device.

The inventor has conceived and reduced to practiced, a system and method for omnichannel text-based communication using adaptive link generation. According to various embodiments, a consumer views some form of advertisement, e.g., webpage banner, Internet browser popup, billboard, poster, business card, QR code, etc., and initiates interest in the product of service the advertisement is promoting. The advertisement may be static or dynamic depending on the medium used. Dynamic (electronic-based) advertisements may change in real-time based on a variety of factors not limited to, audience, time, location, device, facial recognition, etc. Initiation of interest by the customer (i.e., sales lead) may also take many forms. Non-interactive mediums such as posters, billboards, and flyers may have a specific phone number to call or QR code which auto populates a phone number or text on the users mobile device and upon the user activating, the system will autogenerate a text-based communication to be sent to the caller in response. Electronic advertisements may have a button, hyperlink, or swipe function to auto generate a communication with the system. Some advertisements may be limited to one or more communication methods, other advertisements may allow all forms of communication. Communication methods used may be SMS, social media messaging, webchat (chatting over Internet communication protocols such as HTTP), phone call, etc. Some embodiments make use of a chatbot, utilizing Artificial Intelligence (AI), or natural language processing, or third party services that initiates a conversation with the user after the user has interacted with the advertisement or initiated contact. The chatbot may ask a series or questions related to the product or service in question. These questions may be stored in a database, predetermined, however, other embodiments anticipate natural language processing to respond in-kind to the users questions. The chatbot may recognize when a customer does not want to answer the questions posed and initiate a transfer to a sales agent for the desired product or service. However, any and all information collected by the chatbot is forwarded to the sales agent thus increasing the sales agent's awareness and saving time for the customer.

As one example, the omnichannel text-based communicator receives one or more of the various forms of communication (e.g., text, call, webchat, etc.) from a customer via the customer's mobile device about some product or service. This communication triggers a message, typically a SMS message but may comprise other forms of messaging, to be sent to the customer's device with further information about the product and service as well as a follow up questions from an automated chatbot. This chatbot uses AI to communicate with the customer and request information from the customer such as desired product features, price range, location, or other metrics relating to the customer and the product or service. After this automated chatbot experience, the customer is presented with one or more communication options to continue the conversation with a real person, i.e., an agent or sales staff. The system finds an available agent via one or more methods such as a round-robin style search function. Once an agent has accepted, the conversation communication will be transferred and any pertinent information collected from the chatbot experience (may be metadata, customer profile information, desired product features, etc.) will be forwarded to the sales agent via the agent's or business preferred communication method. This enhances sales lead acquisition, retention, and closes.

According to one embodiment, an advertisement (e.g., webpage) for a vehicle is seen by a potential customer. A tap text link—a URL that requests the customer's phone number—is present on the advertisement. The potential customer clicks on the tap text link and enters their phone number. The phone number and vehicle information are received by the system which then triggers the chatbot to respond to the potential customer. The chatbot follows up with questions regarding credit history, location, trade-ins, down payments, and/or anything that may be desired information by a vehicle dealership. Additionally, all follow up questions are related to the specific vehicle due to the transmission of one or more unique identification numbers associated with the advertisement the customer clicked the tap text link from. Once the series of questions are complete, or upon request from the customer, the system forwards the potential customer to a sales agent along with any and all pertinent information collected. A series of methods are described herein allowing various methods to choose which sales agent receives which call and in what priority. The chatbot may generate a message to the customer with a link or button allowing the customer to auto-populate their communication device with the sales agent's contact information. The contact information may or may not be the actual information of the sales agent as the system may mask all customer and sales agent uniquely identifying information for compliance with standards. All interactions and information collected may be stored in an analytics database for further use.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in said arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 2:
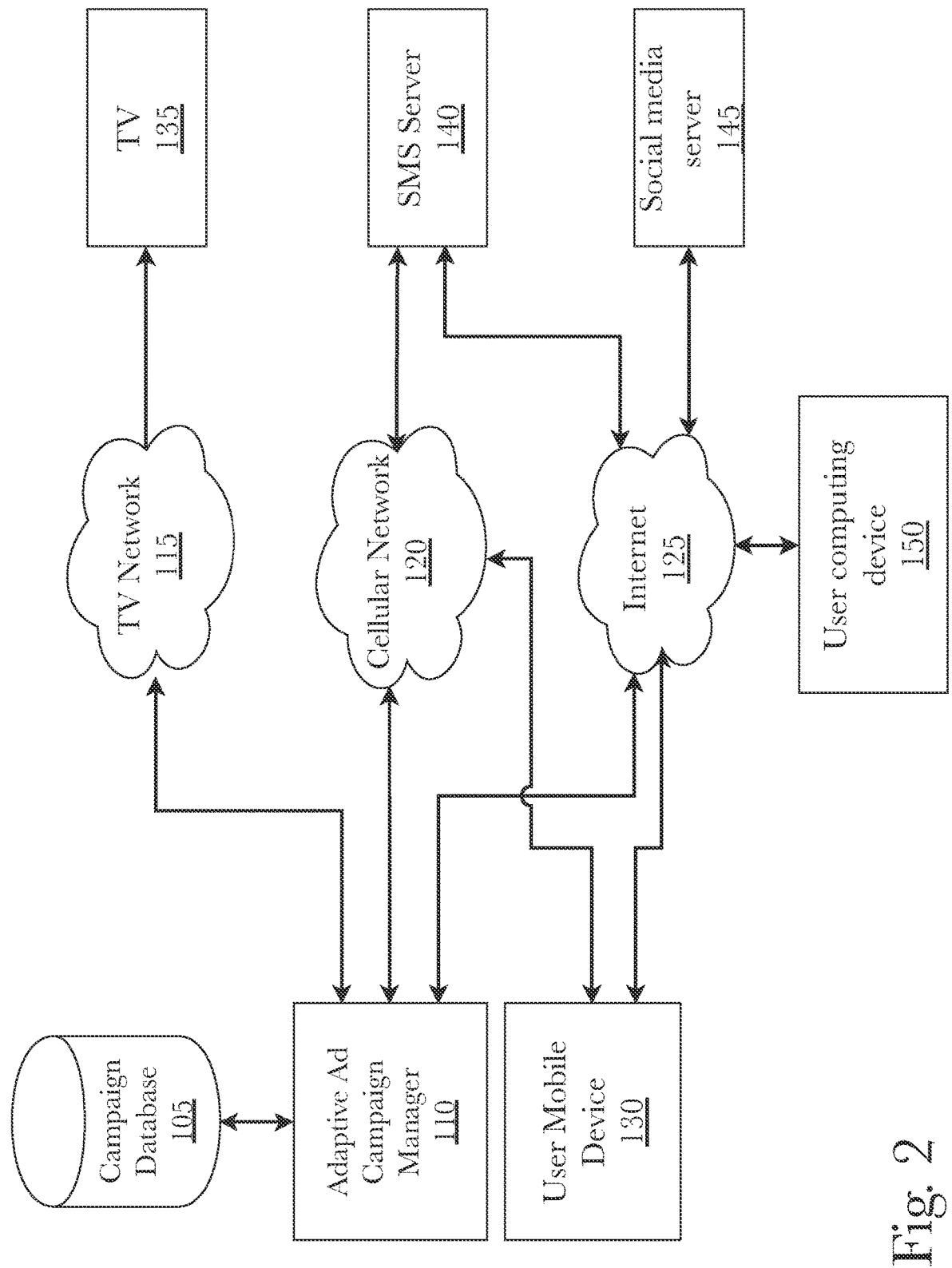
FIG. 2 is a method diagram of an omni-channel text-based communicator platform with TCPA compliant mobile device.

FIG. 1 is a block diagram illustrating an exemplary system architecture 160 for an omnichannel text-based communicator system and FIG. 2 is an exemplary method diagram thereof. According to a preferred aspect, system 160 comprises an interaction control system 300, a routing system 400, a media translation system 500, and databases 155. Customers 170 and their user mobile device(s) 130, agents 175, 177 and their business user mobile device(s) 132, other business user device(s) 134, and TCPA compliant mobile device(s) 136 used by agents 175, 177, may connect to omnichannel text-based communicator system 160, typically via a cellular phone network 122, although connections may be made through other means, as well, such as through the Internet 125 via a Wi-Fi router for example. Similarly, customer user compute devices 150 may connect to omnichannel text-based communicator system 160 over a Local Area Network ("LAN") or Wide Area Network ("WAN"), the Internet 125, a direct physical connection to another device, or some other network connection. System 160 may connect to $3^{rd}$ party or external systems or components, such as Customer Relationship Management ("CRM") systems, Private Branch Exchange ("PBX"), traditional telephony call center agents, voicemail systems, and so forth, through 3rd party data gateway 180.

According to an aspect, a business may access a business user mobile device 132, business TCPA compliant mobile device 136, or business user compute device 152 to enter or update a variety of business information or business operational data that may be stored in a database 155, 172, 173. Examples of the types of information or operational data that a business may enter include, but are not limited to: business name, branch name, location, types of product or server provided (e.g. vehicle make/model/year, maintenance/repair/cleaning), item pricing, credit terms, special pricing promotions, business hours of operation, inventory information, promotional information, staff and employee training and skill information, and other business operational data.

According to another aspect, TCPA compliant mobile device 136, which is a device that is in compliance with the Telephone Consumer Protection Act (TCPA) of 1991, after an initial device power on sequence, must connect with interaction control system 300 and request business user (agent 175) authentication, business user authentication may involve user data input, user data input may include what the user knowns (e.g. user name, user password, personal identification number, etc.), what the user has (e.g. mobile push authenticator, multi-factor authentication code generated from $3^{rd}$ party device such as GEMALTO™, GOOGLE AUTHENTICATOR™, or other device), something the user is (e.g. biometric data from retinal scan, fingerprint, DNA sample and the like), or some other verification technique available to those skilled in the art. Once interaction control system 300 has enabled communication of business user mobile device 136, business user mobile device may select customer mobile device 130 from an interaction database 155, enterprise CRM system 172 or other data repository, through 3rd party data gateway 180 and request to initiate an interaction through interaction control system 300. An interaction control system 300 will initiate communication through media translation system 500 which in turn will mask ("ghost") business user mobile device 136 from customer use mobile device 130, and mask customer user mobile device 130 from business user mobile device 136, setup an interaction between customer user mobile device 130 and business user mobile device 136, interaction details may be logged in database 155.

Similarly, a customer may access customer user compute mobile device 130 or customer compute device 150 to create and update user profile information that may be stored in database 155, 172. Examples of the type of information a customer may enter include but are not limited to: name, address, contact information, preferred method of contact (e.g. mobile phone, email), payment (WELLSFARGO™, VENMO™, PAYPAL™) or credit card information (e.g. VISA™, MASTERCARD™, DISCOVER™) other personal information such as interests or hobbies (e.g. playing board games including but not limited to Backgammon or Go, creative writing, sports cars, growing microgreens, brewing craft beer, camping, hiking and the like).

Data stored in database 155 may be used by an interaction control system 300, routing system 400, media translation system 500, or $3^{rd}$ party CRM system 172 to optimize business communications between customers and a business entity. Database 155 may take the form of a managed or unmanaged database, document-oriented database system, or a Structured Query Language ("SQL") database. Examples of types of database software that may operate include MYSQL™, ORACLE DATABASE™, MONGODB™, and others. It may exist as a distinct physical device or be operating on another computing device that may perform other functions aside from operating, hosting and serving the database 155. If it is a distinct physical device, the database may be connected over a LAN or WAN, the Internet, a direct physical connection to another device, or some other network connection.

In an aspect, system 160 may be able to determine certain information by accessing 3rd party data gateway 180 such as a CRM system or CRM database 172, mapping websites and applications. For example, system 160 may access an existing CRM system which the business maintains and contains, for example, customer purchase history, customer preferred contact method (e.g. mobile phone, e-mail), customer preferred contact times, customer previous interaction history and so forth. Further, system 160 may access a publicly available mapping website such as GOOGLE™, which may contain information about the business location, product availability, hours of operation, phone number, etc. Thus, in some aspects, it is not necessary for the business to enter certain information through portal, as the information may be automatically obtained from 3rd party data gateway 180.

In another aspect, when a customer user mobile device 130 when prompted by a link (tap text link) or call to action 171 connects to interaction control system 300 and requests to communicate with a business representative 175 (e.g. salesperson, support specialist, agent etc.), interaction control system 300 queries database 155, 172 for customer profile data, interaction control system requests target routing information from routing system 400. Routing system will execute routing script that may query database 155, 173 to access and send target routing information to interaction control system 300. An interaction control system 300 will send a request to a media translation system 500 to set up an interaction (i.e., conversations 174) between customer user mobile device 130 and business user mobile device 132. Upon termination of interaction, which may be initiated by customer user mobile device 130, or business user mobile device 132, and acted upon by interaction control system 300 in concert with media translation system 500, interaction details may be logged in database 155.

In an aspect, when a customer user mobile device 130 connects to interaction control system 300 and requests to communicate with a business representative (e.g. salesperson, support specialist, etc.), interaction control system 300 queries database 155 for customer profile data, interaction control system requests target routing information from routing system 400. Routing system will execute routing script that may query database 155 to access and send target routing information to interaction control system 300. An interaction control system 300 will send a request to a media translation system 500 to set up an interaction between customer user mobile device 130 and business user mobile device 132. Once communication is established, a different business user 134 may necessitate a transfer of the interaction from business user 132 to business user 134 and a subsequent termination between the customer user mobile device 130 and business user mobile device 132. An interaction transfer 176 may be initiated by customer user mobile device 130, or business user mobile device 132, and acted upon by interaction control system 300 in concert with media translation system 500, interaction details may be logged in database 155. Routing system will execute routing script that may query database 155 to access and send target routing information to interaction control system 300. An interaction control system 300 will send a request to a media translation system 500 to set up an interaction between customer user mobile device 130 and business user mobile device 134 132.

In another aspect, an interaction transfer may be initiated without the explicit use of routing system 400. In this example, business user mobile device 132 may select business mobile device 134 destination address from an interaction database 155, enterprise CRM system or other data repository, through 3rd party data gateway 180 and request a transfer through interaction control system 300. An interaction control system 300 will initiate transfer through media translation system 500 which in turn will mask ("ghost") business user mobile device 134 from customer use mobile device 130, and mask customer user mobile device 130 from business user mobile device 134, setup an interaction between customer user mobile device 130 and business user mobile device 134 and terminate interaction with business user mobile device 132, interaction details may be logged in database 155.

In an aspect, when a customer user mobile device 130 connects to interaction control system 300 and requests to communicate via voice with a business representative (e.g. salesperson, support specialist, etc.); interaction control system 300 queries database 155 for customer profile data, interaction control system requests target routing information from routing system 400. Routing system will execute routing script that may query database 155 to determine target resource; and send target routing information to interaction control system 300. An interaction control system 300 will send a request to a media translation system 500 to set up an interaction between customer user mobile device 130 and business user mobile device 132. Media translation system may mask information and data so that customer user device 130 cannot be identified by business user device 132, and business user device 132 cannot be identified by customer user device 130. Should business user mobile device 132 not accept the request to connect, interaction control system 300 may request another enterprise resource via the routing system 400 which in turn will execute routing script that may query database 155 to determine next target resource which will repeat until all enterprise resources are exhausted (i.e. no enterprise resource is available to accept the call) or call has been accepted by the business user mobile device 132. Should all enterprise resources be exhausted, the voice call may be routed to a voicemail system corresponding to one of the enterprise resources or a general voicemail box. When customer user device 130 connects with voicemail box via 3rd party data gateway 180 and leaves a voicemail, or not, an electronic notification (e.g. text message) is sent via interaction control system 300 to business user 132 of customer user device 130 failed attempt to connect with a live enterprise resource. Business user mobile device 132 may send an electronic message (e.g. text) to customer user device 130 who may accept request or not. If accepted an interaction (e.g. voice, text or other) may be set up between customer user device 130 and business user device 132 via interaction control system 300 in concert with media translation system 500 such that media translation system 500 may mask information and data so that customer user device 130 cannot be identified by business user device 132, and business user device 132 cannot be identified by customer user device 130; interaction details may be logged in database 155 or CRM system via 3rd party data gateway 180 which may be made available for future reporting and analytics.

In some other aspect, routing system 400, through business user mobile device 132, may provide information to the business user of upcoming staffing needs which the business user may accept or decline. If the business has entered information such as incentive pay, routing system 400 may use that information to offer the business staff additional monetary or other incentives (e.g. future vacation day with pay) to accept a shift schedule. Such incentives may be adjusted for busy periods at the business, either automatically based on the business's history as stored in a database 155, or by retrieving information stored in a database 155 that has been manually entered by the business through business compute device 152 or business mobile device 132.

Figure 3:
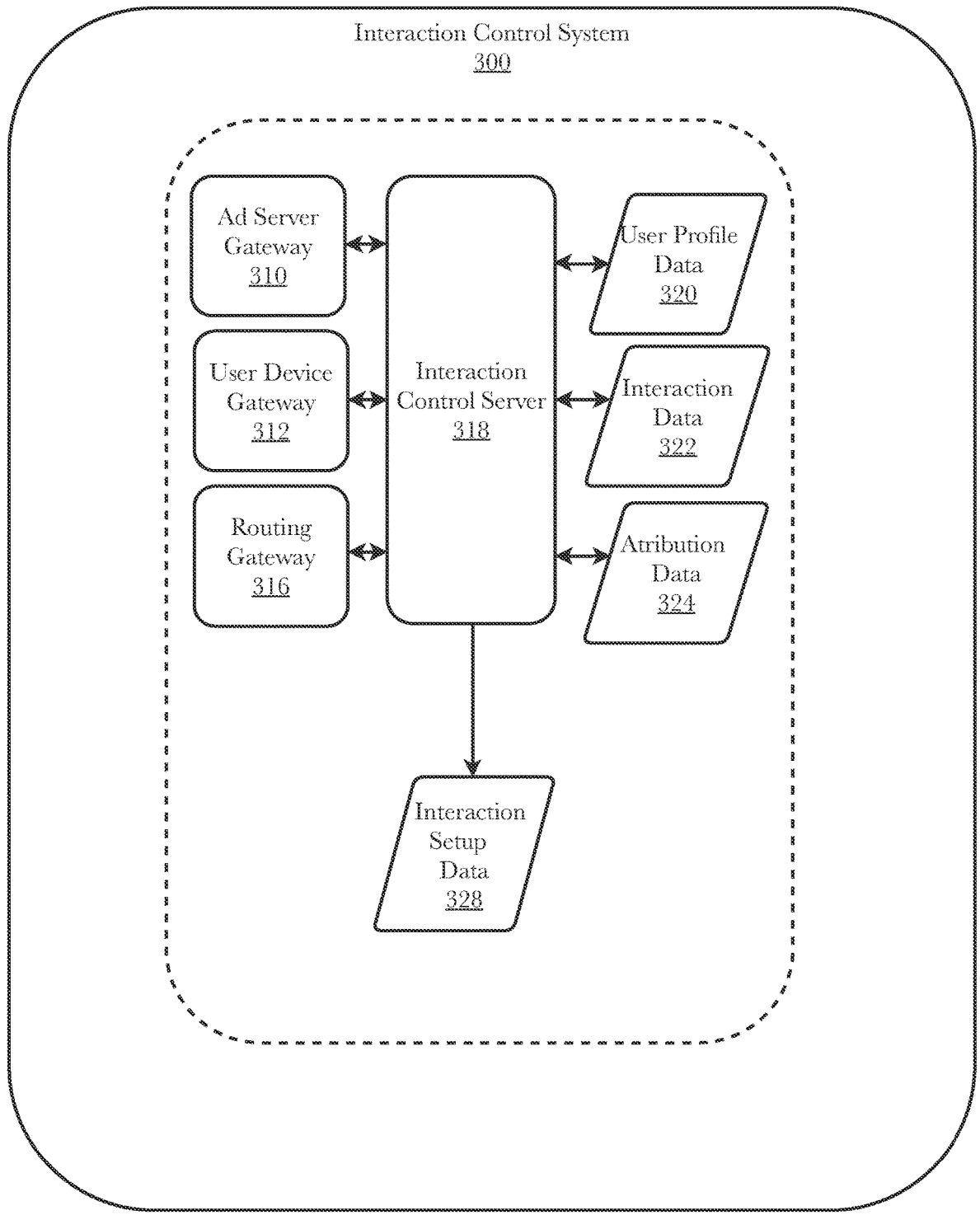
FIG. 3 is a system diagram of an interaction control system.

Now turning our attention to FIG. 3 illustrating an exemplary block diagram architecture for an interaction control system 300. According to an aspect, an interaction control system 300 comprises interaction control server 318, ad server gateway 310, user device gateway 312, routing gateway 316, user profile data 320, interaction data 322, attribution data 324, and interaction setup data 328. In operation, interaction control server 318 may connect, for a bi-lateral data exchange, between ad server gateway 310, user device gateway 312, routing gateway 316; may receive user profile 320, interaction data 322, attribution data 322; may provide as output call interaction data 328.

In an aspect, customer mobile user device 130 that may include a smart phone, or table device, or similar user device capable of sending and receiving electronic messages, may receive a CTA electronic message (e.g. text, chat, email or other electronic message format) from interaction control server 318 via user device gateway 312 which abstracts away any potential communication protocol (e.g. HTTP, RTP, SMS, SIMPLE, TCP, UDP or other protocols that may be in use) that may exist between interaction control server 318 and customer user mobile device 130 or customer user compute device 150. A CTA may include a link to an online retail portal, a referral to a product or service website, directions to a store, discount coupon code, or some other information or content that may cause the customer to act in some way, for example tapping on an electronic picture, clicking on a link or the like; and may be a result of an advertisement campaign or some other indication that a customer may be interested in further engagement with business entity. Upon receiving CTA, a customer through user mobile device 130 may indicate desire to further engage with business by interacting with CTA which may include clicking or tapping on electronic message or some other means that will result in an electronic notification being received by interaction control server 318. An interaction control server 318 upon receiving notification from customer user mobile device 130, may access customer user profile data 320, customer profile data may include name, address, phone number, email, preferred contact method, historical purchase information, customer tiering level (e.g. bronze, silver, gold), personal information (e.g. marital status, number of dependents, net worth, interests/hobbies) or other data that may have been directly provided by customer or obtained by other means including a business CRM system accessible via 3rd party data gateway 180, and may aid the business in optimally handling the customer request to engage with the business; may access interaction data 322, interaction data may include but is not limited to interactions that customer has previously had with business, brand, product, or if available competitor business, brand or product, product or service purchased, amount of purchase, prior communications (e.g. text, chat, email, snail mail, voice call, call center interaction, in-person, telegram or other communication that may be in use) with business or business partner; may access attribution data 324, attribution data may include advertising campaigns run including media channel (e.g. TV, social media, near-field communication, in-store offers, targeted email), dates and times of ad campaigns, aggregate sales data associated with each advertising campaign, customer-specific sales outcome and any other data related to media and marketing efforts and associated business sales outcomes. Once interaction control server 318 has a complete data set of the business-customer relation, this is sent along with a route request via routing gateway 316 to routing system 400.

In another aspect, ad server gateway 310 may provide referral information of a customer interested in receiving additional information (aka CTA) from said business to interaction control server 318, referred information may include customer name, contact information, business name, product or service of interest any other data that may be of use to optimize communication and business outcomes between customer and business.

Figure 4:
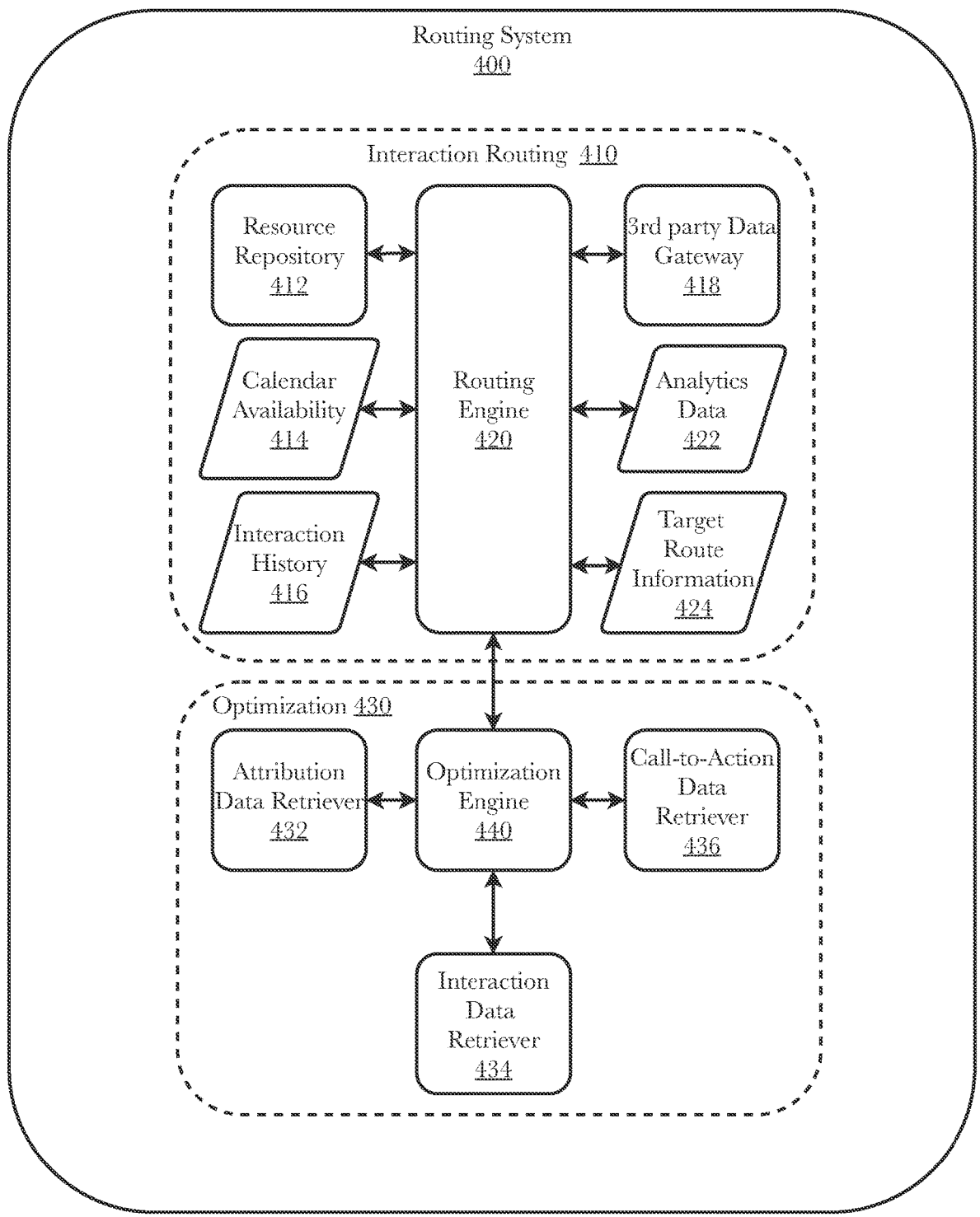
FIG. 4 is a system diagram of a routing system.

Referring now to FIG. 4 illustrating an exemplary block diagram architecture for a routing system 400. According to an aspect, a routing system 400 comprises interaction routing 410 subsystem and optimization 430 subsystem. An interaction routing 410 subsystem further comprising a routing engine 420, routing repository 412, calendar availability 414, routing scripts 416, $3^{rd}$ party data gateway 418, analytics data 422, target route information 424. An optimization 430 subsystem further comprising optimization engine 440, attribution data retriever 432, call-to-action data retriever 436 and interaction data retriever 434.

In operation, routing engine 420 may connect, for a bi-lateral data exchange between optimization engine 440; may receive routing repository 412, calendar availability 414, interaction history 416, $3^{rd}$ party data gateway 418, analytics data 418; and provide target route information 424. An optimization engine 440 may connect for bi-lateral data exchange with routing engine 420, attribution data retriever 432, interaction data retriever 434, and call-to-action data retriever 436.

In an aspect, routing engine 420 receives a route request from interaction control server 318, routing engine may execute routing logic that may be implemented within routing script 416, routing logic may take into account sequential, 'round robin', or percent-based allocations to distribute to target or may utilize resource repository 412, resource repository may include available routing resources including call center agents, traditional IVR, voice portals, AI-driven chatbots or voice portals, non-traditional agent sources including sales personnel, field sales, support specialist or other resources that may be able to interact with customer; may utilize calendar availability 414, calendar availability may include available time from target routable resources (e.g. sales person, support specialist), calendar systems may in $3^{rd}$ party systems such as MICROSOFT OUTLOOK™, GOOGLE CALENDAR™, LOTUS NOTES™ SALESFORCE™ CRM, SUGAR™ CRM; may utilize analytics data 422, analytics data may include operational data, sales data, customer data or any other data that may assist with routing decisions; generate target route information 424, target route information may include resources from business entity traditional call center including but not limited to: traditional phone-based agents, multimedia (including email, chat, text) agents, AI-based or traditional interactive voice response ("IVR") systems, AI-driven chat bots or speech bots; non-traditional resources including but not limited to field sales and support or other resources that have access to user mobile devices 132 or business compute device 152 and may include resource name (e.g. Jim Johnson), title (e.g. car sales advocate), destination address (e.g. 360.867.5309), and any other information that may be useful in delivering interaction; and provide results to interaction control server 318 to determine optimal target to deliver customer interaction.

In another aspect, routing logic may be implemented within routing script 416 and use Artificial Intelligence ("AI") techniques known to those skilled in the art including deep learning algorithms and incorporate data resources as listed in previous paragraph along with an array of other factors including but not limited to time-of-day, day-of-week, store hours, resource availability, service level requirements, previous customer interaction and transactions, customer tiering structure, data from $3^{rd}$ party systems including but not limited to CRM systems, location-based services, weather-services and so forth.

Note that this example is simplified for clarity, and that routing system 400 may employ a much broader set of factors and variables, as described elsewhere herein. The optimization engine 440 may use any number of optimization algorithms, including machine learning algorithms or others known in the art, to find routing targets to optimize business outcomes based upon a large number of variables presented.

Figure 5:
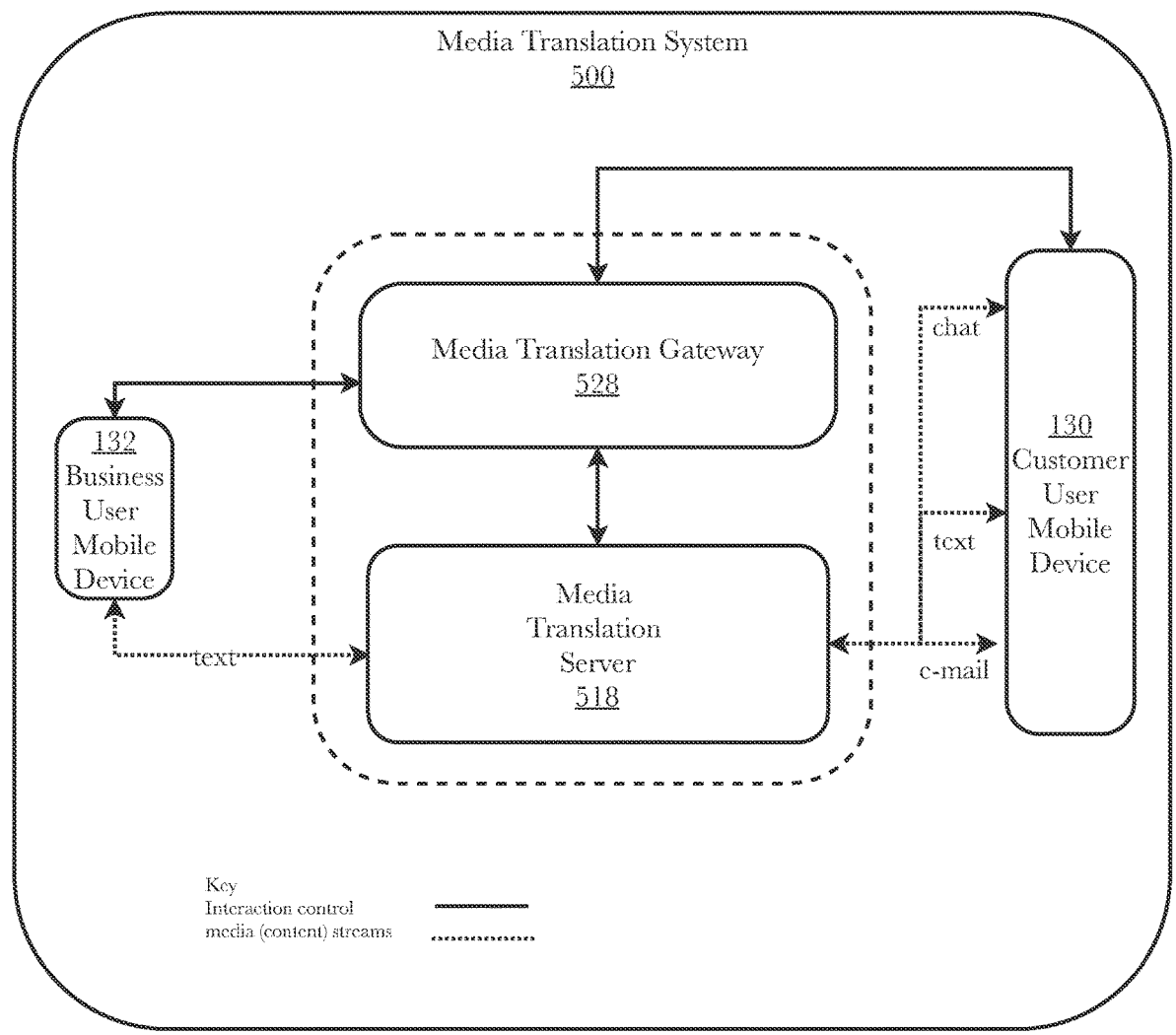
FIG. 5 is a system diagram of a media translation system.

Referring now to FIG. 5 illustrating an exemplary block diagram architecture for a media translation system 500. According to an aspect, a media translation system 500 comprises media translation gateway 518, media translation server 528. A customer user mobile device 130, other customer compute device 150, or a business user mobile device 132 may connect via a cellular network 122 and establish a bi-lateral data exchange.

In operation, when the media translation gateway 518 receives call interaction data 328 from interaction control server 318, it will establish interaction control legs between business user mobile device 132 and customer user mobile device 130 masking any identifying information of customer or customer user mobile device 130 and of business user mobile device 132 such that neither business user mobile device 132 nor customer user mobile device 130 will know the particular identity of the device. In some aspects, the customer user mobile device 130 device or business user mobile device 132 may be allowed to know some information about the user endpoints which may be configurable by users of the system.

In some other aspects, business user mobile device 132 may without changing applications or devices use text messages (e.g. SMS or other protocols known to those skilled in the art) to interact with and respond to customer mobile device 130 or customer user compute device 150 through media translation server 528 which enables media translation from one electronic form (e.g. SMS) of communications to other electronic forms (e.g. SMS, email, chat).

Figure 6:
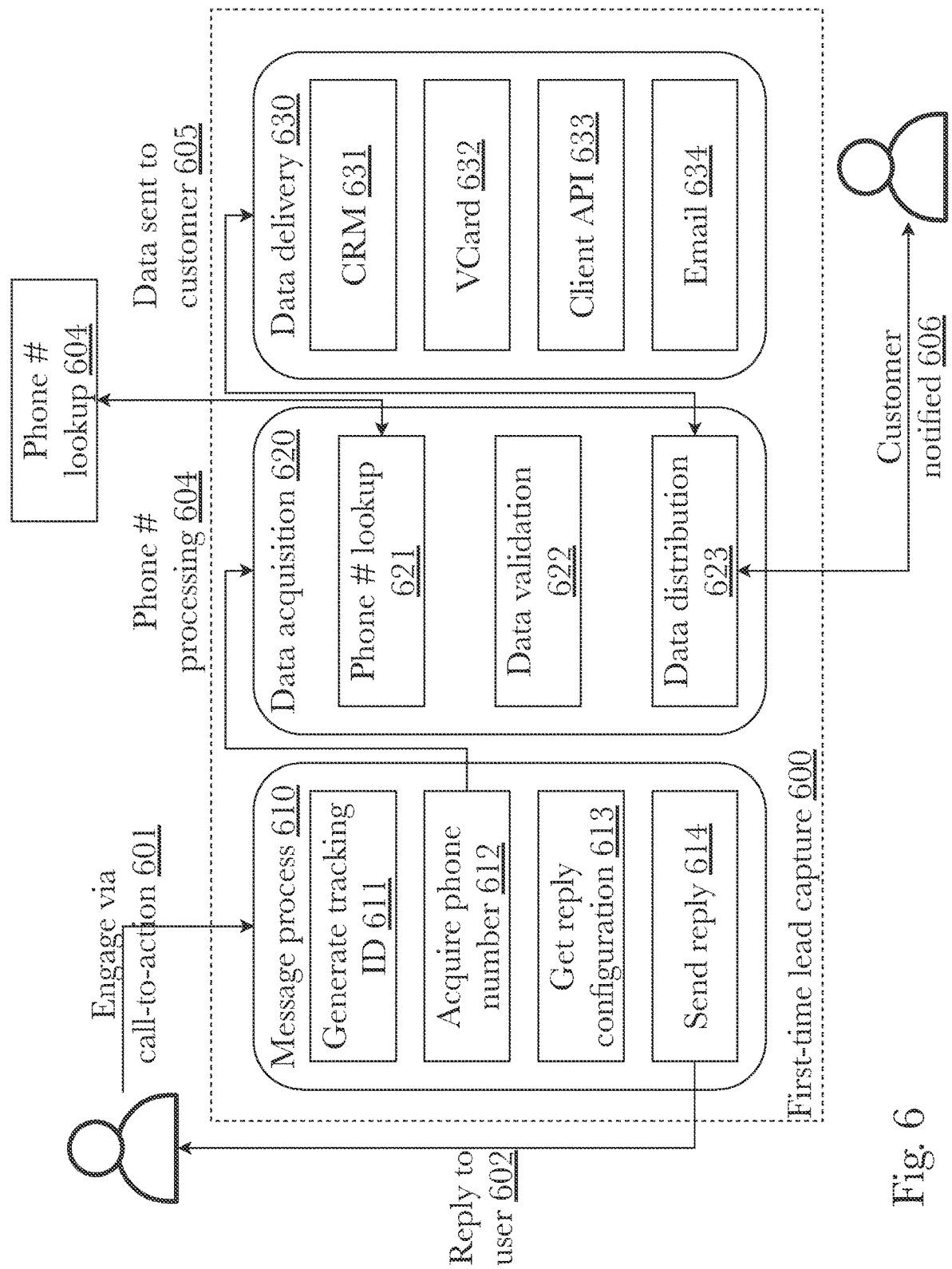
FIG. 6 is a diagram illustrating a process for processing a call-to-action in a first-time lead capture.

FIG. 6 is a diagram illustrating a process for processing a call-to-action in a first-time lead capture 600. According to the illustrated process, a user first engages with a call-to-action (CTA) element 601, such as (for example, including but not limited to) scanning a QR code or other visual element that encodes instructions to be executed on their device, submitting a phone number or other information via a webpage or form, or clicking or tapping (according to the input capabilities of the particular device being used) an interactive element or link. The CTA feeds information into a message processing phase 610, where a tracking ID is generated 611 for the user or interaction, that may be used to identify existing users (as described below, with reference to FIG. 7). The user's phone number may be collected 612, for example from a form submission or retrieved from device information as part of instructions encoded in the CTA element, or may be retrieved using a data acquisition process 620. During data acquisition, the user's phone number may be looked up 621 from a lookup service or directory 604 if it was not retrieved from the device or CTA data. Data may be validated 622, for example comparing against public resources or previously-known information to determine a match, and then data may be distributed 623 according to the particular configuration of the process and CTA involved. For example, user information may be fed into a data delivery process 630 that processes available information for storage and use in various systems such as (for example, including but not limited to) a CRM system 631 that may store customer information for future use, a VCard 632 or similar contact-card format for ease of sharing and retrieval, any of a variety of client-facing APIs 633 that may be used to facilitate integration with a client's particular systems (such as, for example, various systems in use by a contact center or datacenter), or an email system 634 that may use an email address associated with the user to associate them with mailing lists or other offers. The customer (i.e., any corporate or other entity that is utilizing the functionality provided by the method) may then be notified of the new lead 606. After data acquisition and delivery, a reply configuration may be retrieved 613, such as instructions for providing a particular response to the user's interaction and any information that should be populated and provided in the response. The reply may then be sent 614 to the user's device 602 via a selected communication channel according to the reply configuration, for example replying via an SMS text message or a push notification to a mobile device associated with the user.

Figure 7:
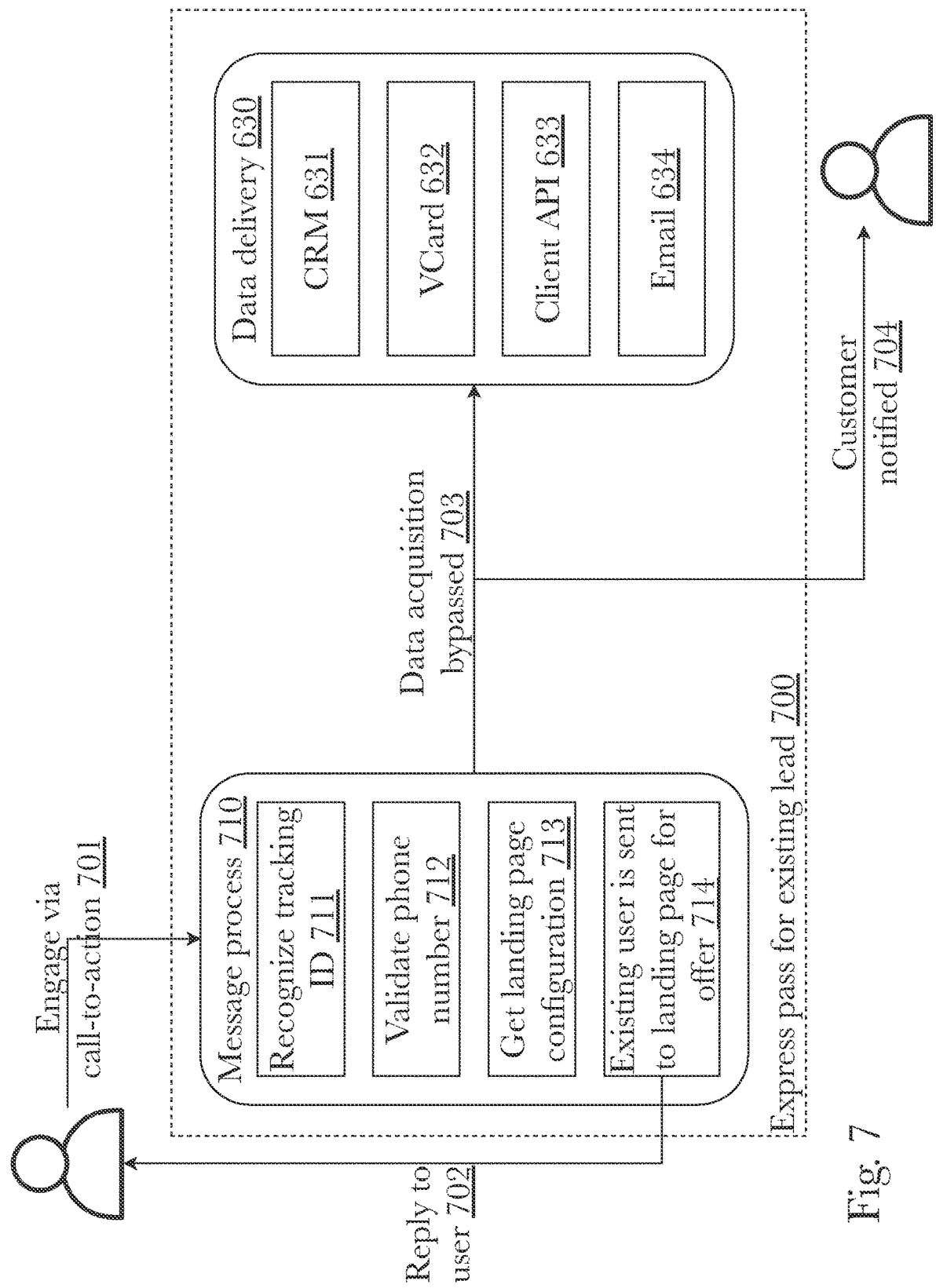
FIG. 7 is a diagram illustrating a process for processing a call-to-action for an already-existing lead.

FIG. 7 is a diagram illustrating a process for processing a call-to-action for an already-existing lead 700. According to the illustrated process, a user first engages with a call-to-action (CTA) element 701, such as (for example, including but not limited to) scanning a QR code or other visual element that encodes instructions to be executed on their device, submitting a phone number or other information via a webpage or form, or clicking or tapping (according to the input capabilities of the particular device being used) an interactive element or link. The CTA feeds information into a message processing phase 710, where a tracking ID may be recognized 711 to identify that this is a previous user or a continuing interaction. The user's phone number or other contact information may be validated 712, for example by comparing contact information provided in the current interaction against stored information from previous interactions associated with the tracking ID. Any new information may be sent directly to a data delivery process 630 as described above (with reference to FIG. 6), bypassing data acquisition for the existing user and notifying the customer of the repeat interaction 704. A landing page configuration may be retrieved 713, to load information for presenting a landing page with relevant offers 714 based on the interaction (such as the nature of the specific CTA with which the user interacted, or information provided by the user), which may be sent to the user 702 for viewing and interaction.

Figure 8:
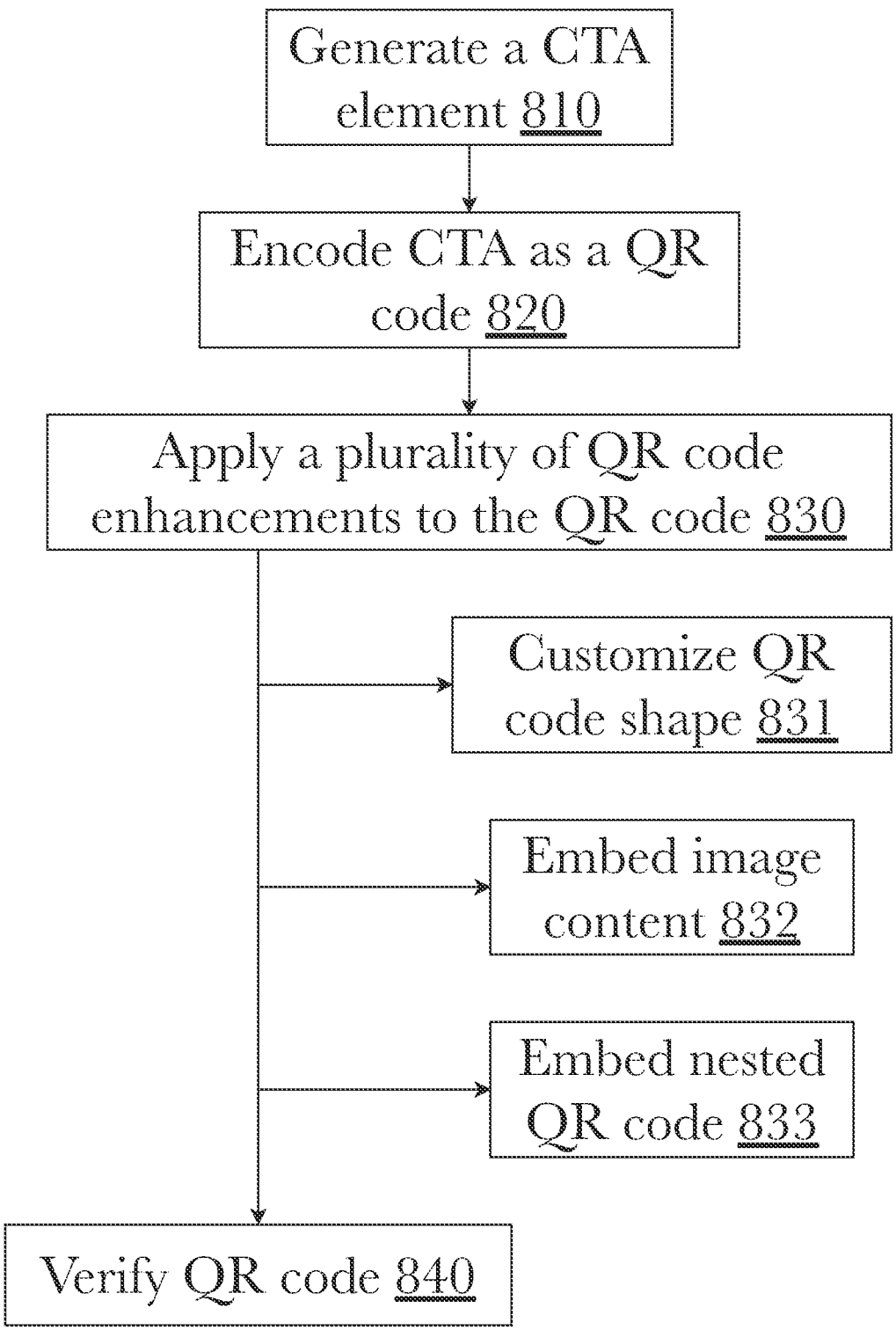
FIG. 8 is a flow diagram illustrating an exemplary method for generating and verifying an enhanced QR code.

FIG. 8 is a flow diagram illustrating an exemplary method 800 for generating and verifying an enhanced QR code. Initially 810, a CTA may be generated that comprises instructions or information such as (for example, including but not limited to) a uniform resource indicator (URI) that may be processed by a web browser or other software application. Generally, a URI is used to retrieve a webpage or formatted content that may trigger actions on a device, such as opening a text messaging application and pre-populating information within a message for a user to review and send. URIs may also comprise query fields that may be populated with information based on, for example, device hardware or software information such as a browser identifier, network connection, screen size, or other information that may be known by the device parsing the URI. The CTA instructions or content (such as a URI with query fields to provide device-specific information when scanned), may be encoded as a QR code 820 by processing the text content of the CTA and translating it according to published QR code standards. For example, a standards-compliant QR code requires the use of a plurality of location indicators that a device camera uses to recognize the QR code from other image content within view, as well as a number of optional elements such as alignment indicators for larger QR codes to ensure accurate scanning (for example, when scanning a printed QR code from a page that may not be perfectly flat and perpendicular to a scanner lens). This produces a standard QR code comprising a two-dimensional (2D) array of visual elements that translates to the text content when scanned. To provide enhanced functionality, additional elements may then be incorporated 830 into the QR code beyond what is required by a published standards specification, such as (for example, including but not limited to) the use of customized code shapes 831, additional image content 832, or the use of secondary embedded QR codes 833 that may be placed within the enhanced QR code. Each of these enhancements may be used to provide additional data beyond what is possible with standard 2D encoding, and multiple elements may be combined as desired to achieve a particular CTA result. Finally, a software-based QR code interpreter may be used to translate the resulting enhanced QR code to ensure proper function 840, such as verifying that any desired data fields are populated in a URI, the formatting and content are correct, and parsing the URI produces the expected CTA response.

Any number of QR codes and various instructions they comprise may be generated and optionally stored for future use or revision, and it thus is possible to maintain control over an already-published QR code through control of the database containing the CTA responses triggered by scanning the QR code. For example, a QR code comprising a URI that fetches web content (for example, such as a tailored web page designed to open a messaging application on a smartphone or other mobile device) may be modified by altering the web content that is served, without the need to change the encoded QR code content and publish a new code. By operating in a request-response arrangement, any number of QR codes may be published without need to update or modify their content in the future, and any changes may be performed at the database instead. This also provides functionality for disabling QR codes, or providing controlled access; for example, a QR code may comprise a URI that automatically submits certain device or user information with the request (for example, a device browser or operating system version). This user or device-specific information may be used when processing the URI and selecting web content to provide, such as to provide content that is compatible with a particular web browser application or operating system, or to provide specific content to certain devices or users while providing different content to others. This may be further expanded with any of a variety of advanced automation rules, such as scheduling rules that cause the behavior of a QR code to change based on date or time of day (for example, a QR code could provide special holiday content on certain days, or promotional content for a limited time), or rules that change the behavior of a QR code based not only on user or device information but on available third-party information that may be retrieved in response to a scan, click, or other interaction with the code.

Figure 9:
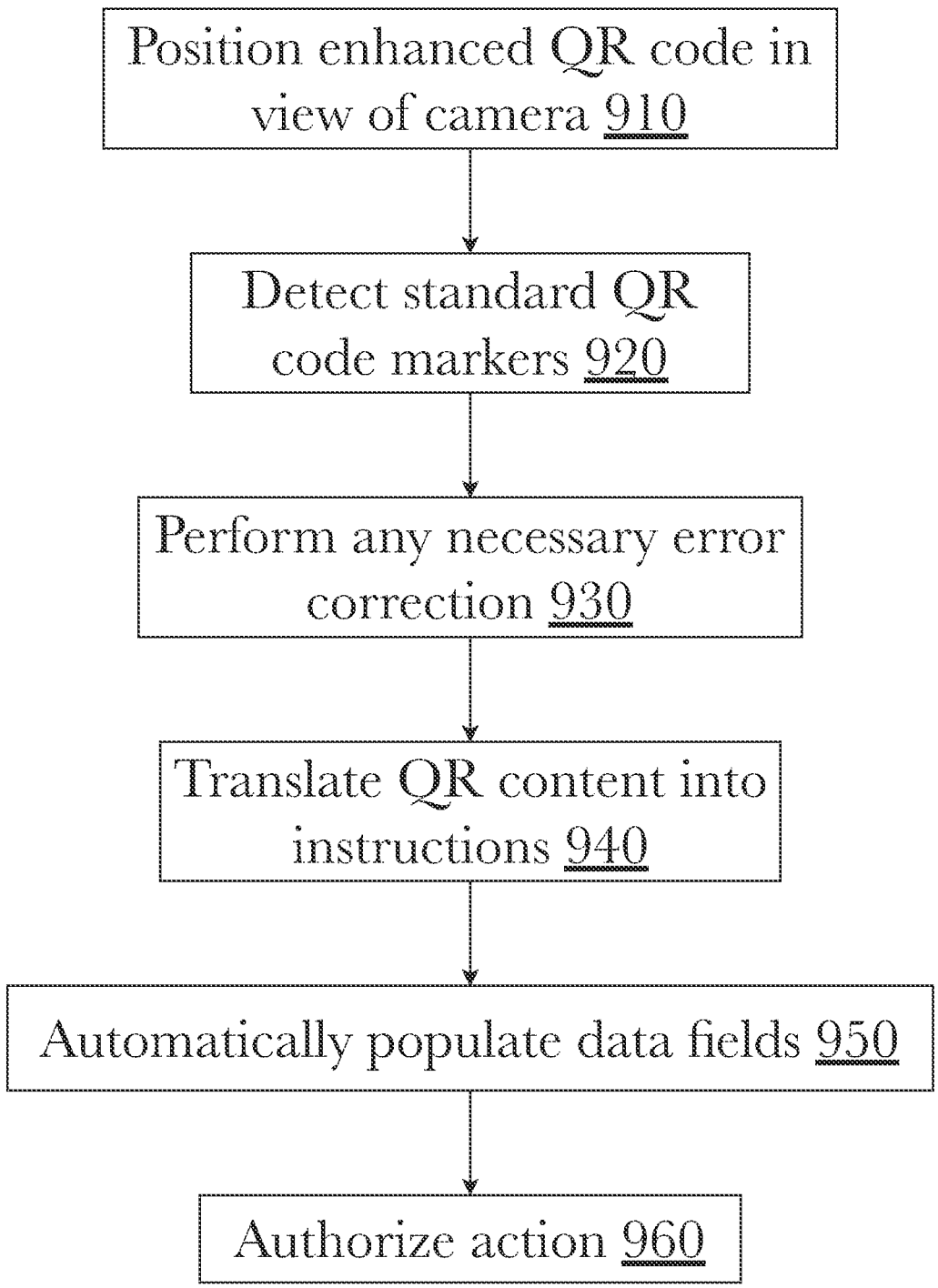
FIG. 9 is a flow diagram illustrating an exemplary method for scanning an enhanced QR code.

FIG. 9 is a flow diagram illustrating an exemplary method 900 for scanning an enhanced QR code. When a user positions an enhanced QR code 910 in view of their device camera, for example with a camera-enabled mobile device such as (for example, including but not limited to) a smartphone or tablet computing device, the camera software may recognize the QR code format from a plurality of standards-compliant elements 920 such as location or alignment markers, as are specified in published standards specifications for QR codes. If the enhanced QR code utilizes a customized shape (that is, the encoded data takes a shape other than the standard square), the data may be read and processed normally using the embedded location and/or alignment markers; QR code standards specify certain measures in both the encoding and the reading of a code to account for damaged or obscured codes. If portions of the code are indeed damaged or obscured, such as a code printed on a wrinkled page or on a worn sign, the device may error-correct 930 using embedded Reed-Solomon error correction codes that are specified as part of the QR code standards, ensuring the code is translated back into the correct text content without error. The content of the QR code may then be parsed 940, for example opening an encoded URI in a web browser application on the device or executing instructions to perform any of a variety of actions. Information fields within an action or URI (for example, text fields in a message or email being generated, or query fields in a URI being parsed) that the device or browser may fill in automatically 950, such as (for example) populating device hardware or software information, a timestamp, or data fields that may be populated using data in memory from any enhanced QR code elements that were scanned. For example, a URI field may be populated with information about an identified embedded image within an enhanced QR code, such as the name of a recognized individual. As another example, a URI may open a messaging application on the user's device and pre-populate information for sending a text message with specific content, such as (for example) a destination phone number or address, specific text fields such as a message title or body, or any other data that may be encoded within the QR code or retrieved in response to prompts or fields that are encoded. The user may then choose to authorize an action 960, such as submitting a populated URI or sending a pre-populated text message, placing a phone call to a pre-populated number, or any other action that may be triggered on the device based on the content encoded within the scanned enhanced QR code.

Figure 10:
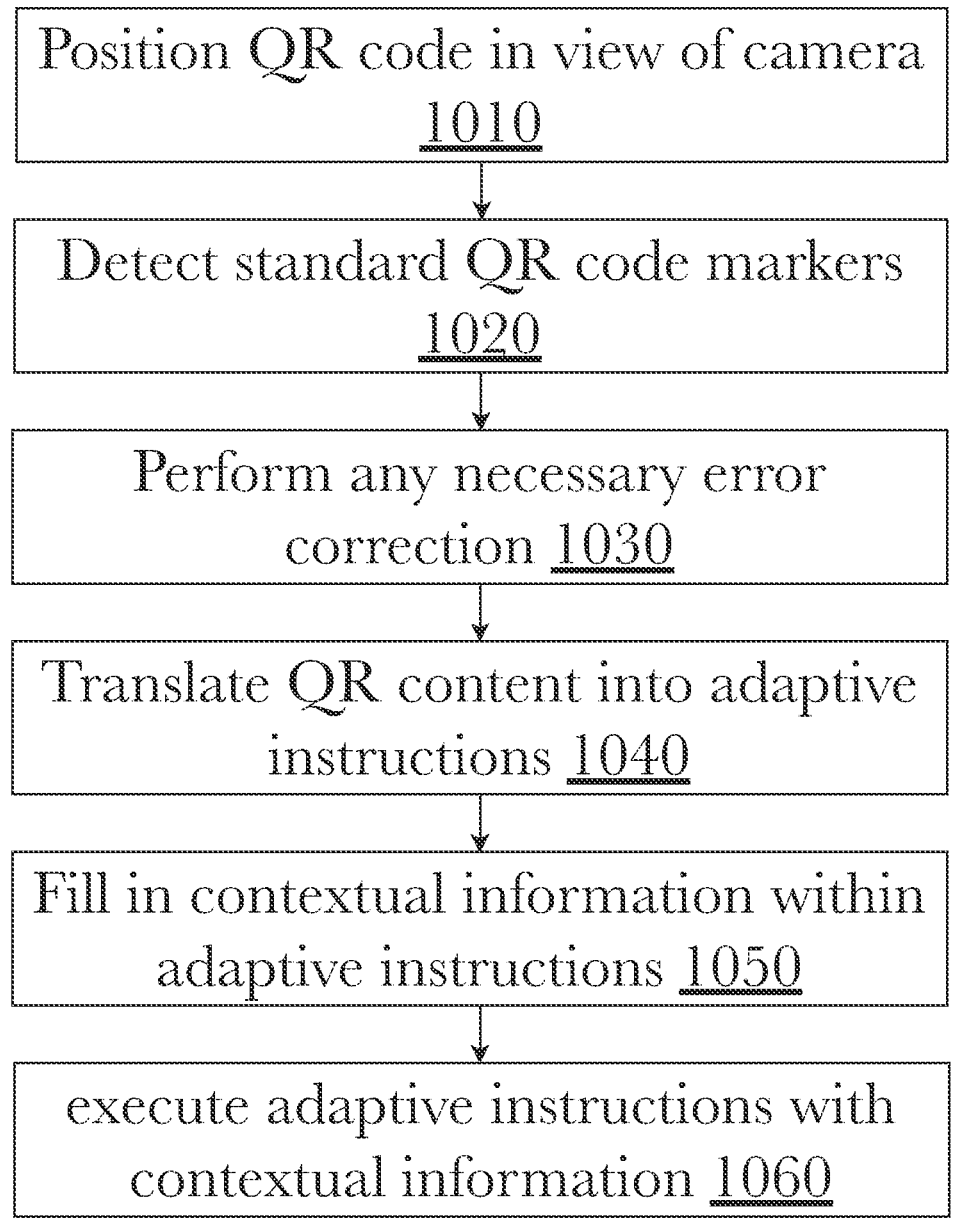
FIG. 10 is a flow diagram illustrating an exemplary method for processing adaptive instructions within a call-to-action.

FIG. 10 is a flow diagram illustrating an exemplary method for processing adaptive instructions within a call-to-action. When a customer positions a QR code 1010 in view of their device camera, the camera software may recognize the QR code format from a plurality of standards-compliant elements 1020 such as location or alignment markers, as are specified in published standards specifications for QR codes. If the enhanced QR code utilizes a customized shape (that is, the encoded data takes a shape other than the standard square), the data may be read and processed normally using the embedded location and/or alignment markers; QR code standards specify certain measures in both the encoding and the reading of a code to account for damaged or obscured codes. If portions of the code are indeed damaged or obscured, such as a code printed on a wrinkled page or on a worn sign, the device may error-correct 1030 using embedded Reed-Solomon error correction codes that are specified as part of the QR code standards, ensuring the code is translated back into the correct text content without error. The content of the QR code may then be parsed 1040 into adaptive instructions to perform context-specific actions, such as (for example) populating information fields 1050 based on contextual information such as time, location, device hardware information (for example, screen size or resolution, processor type, sensor information, or any other available hardware information from the device scanning the QR code and processing the adaptive instructions), or user-specific information such as a phone number associated with the device. The adaptive instructions may then be executed, performing actions based on the contextual information used in the generation of the instructions 1060. For example, a pre-filled text message may be generated using collected device or user information such as a user's name, phone number, current date/time, or location. A web URL may be generated using collected data as input fields such as to query a web resource based on the contextual information, or to automatically provide inputs to fields in an online form. Network information may be collected and used to automatically join a network using contextual information such as a hardware ID for a device's network interface, time, or location to modify the connection settings (for example, using location information to join a specific access point or to utilize a particular frequency band, such as detecting that a device is indoors and connecting to an available band with better wall penetration).

In this manner, it can be appreciated that the collection of contextual information at the time of scanning a QR code may be used to enable adaptive instructions that perform actions based on the conditions at the time of scanning, so that a single QR code may produce different results on separate scans (or, depending on the particular arrangement, no two scans will yield an identical result). For example, a single QR code printed on a physical sign may produce different results when scanned by different users or devices, or when scanned at different times or on different days, or when scanned under specific lighting conditions such as using colored lights or filters to manipulate the results of the adaptive instructions. In an advertising context, this may be used to enable limited-time advertisements or offers that are only produced when a QR code is scanned during a particular time or on particular days, enabling a wide variety of additional features without needing to produce additional QR codes and without concerns of expired offers still being presented due to an out-of-date QR code that needs to be replaced or modified. This may also be used to facilitate a variety of augmented reality (AR) functions, such as using colored light to produce specific, repeatable results from a scan as a form of interaction with a marketing campaign, game, website, or other interactive content.

Figure 11:
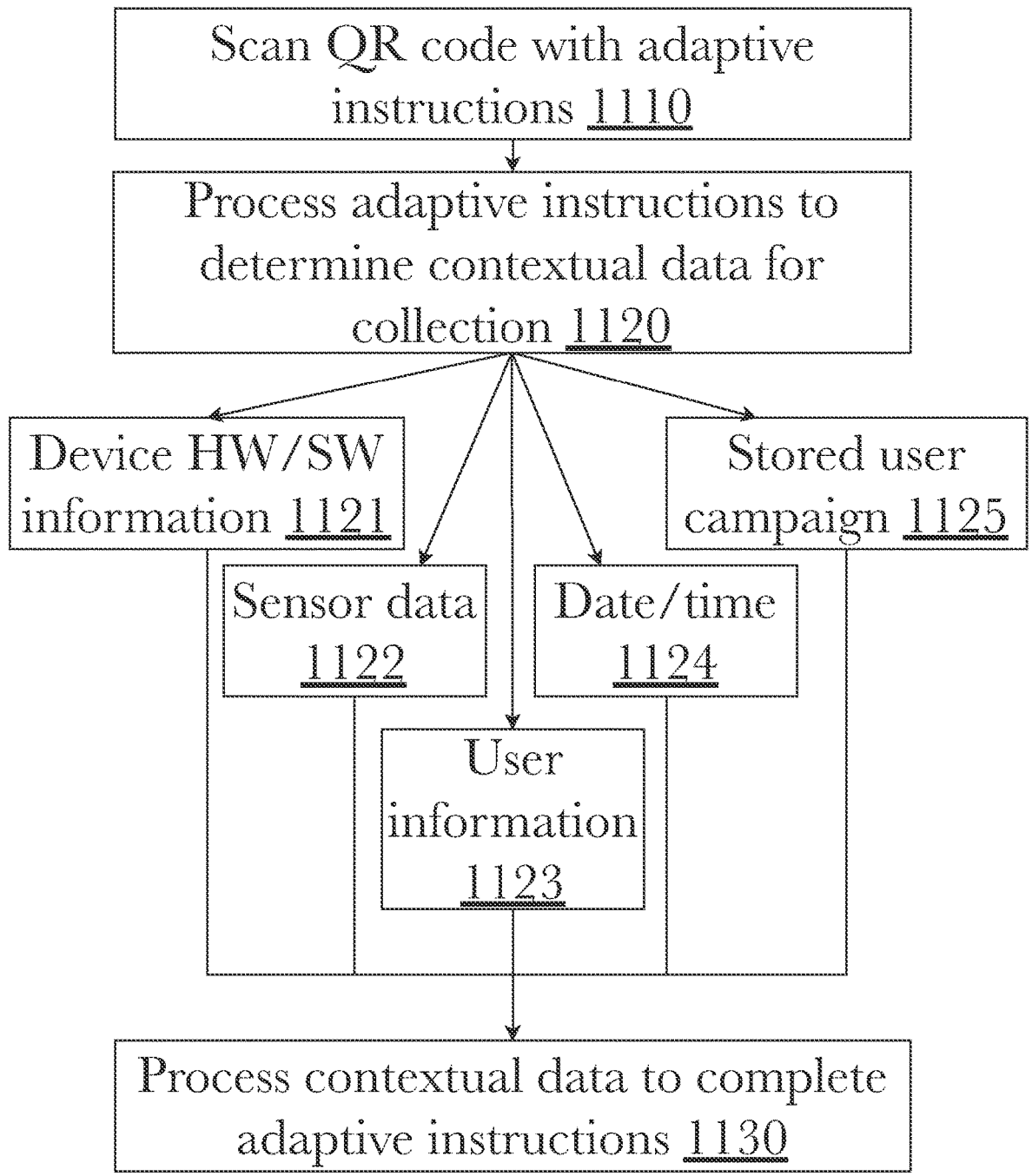
FIG. 11 is a flow diagram illustrating an exemplary method for collecting contextual data for use in adaptive instructions.

FIG. 11 is a flow diagram illustrating an exemplary method for collecting contextual data for use in adaptive instructions. When a QR code comprising adaptive instructions is scanned 1110, the adaptive instructions may be processed 1120 to determine what contextual information needs to be collected according to the particular instructions. According to the particular instructions, a variety of contextual data may be collected and used to complete or execute those instructions, effecting real-time generation at the time of the scan. Device hardware and software information 1121 such as (for example, including but not limited to) hardware IDs, battery capacity, screen size or resolution, operating system, or other installed software packages may be collected and used to tailor the instructions to the particular device or device type being used to perform the scan. Sensor data may be collected 1121, such as location information, barometer sensor data, accelerometer or gyroscope data, or optical sensor data such as cameras or face-scanning components (as are used in a variety of smartphones and similar devices), which may be used for a variety of functions such as modifying the instructions based on device location or orientation, or authenticating a user with facial scanning prior to executing the instructions. User information may be collected 1123 such as a user's name, phone number, account information associated with the device or software operating on the device (for example, social media account information), which may be used to tailor the instructions on a per-user basis for personalized content. Personalized content may be further enhanced through the use of a stored user campaign 1125 retrieved from a database or from data storage on a user's device, as described below in greater detail (with reference to FIG. 12). Date and time may also be collected 1124, to enable time-based instructions that may produce different results depending on the day or time of a scan. For example, instructions embedded within an advertisement may present different offers on certain days or at certain times, such as (for example, including but not limited to) using the date and time information to automatically present a holiday special or a "happy hour" discount to a user at the time of scanning. When all available contextual data that has been requested by the adaptive instructions has been collected, it may then be used to process the instructions 1130 with the contextual information in order to produce the desired, context-aware adaptive result.

Figure 12:
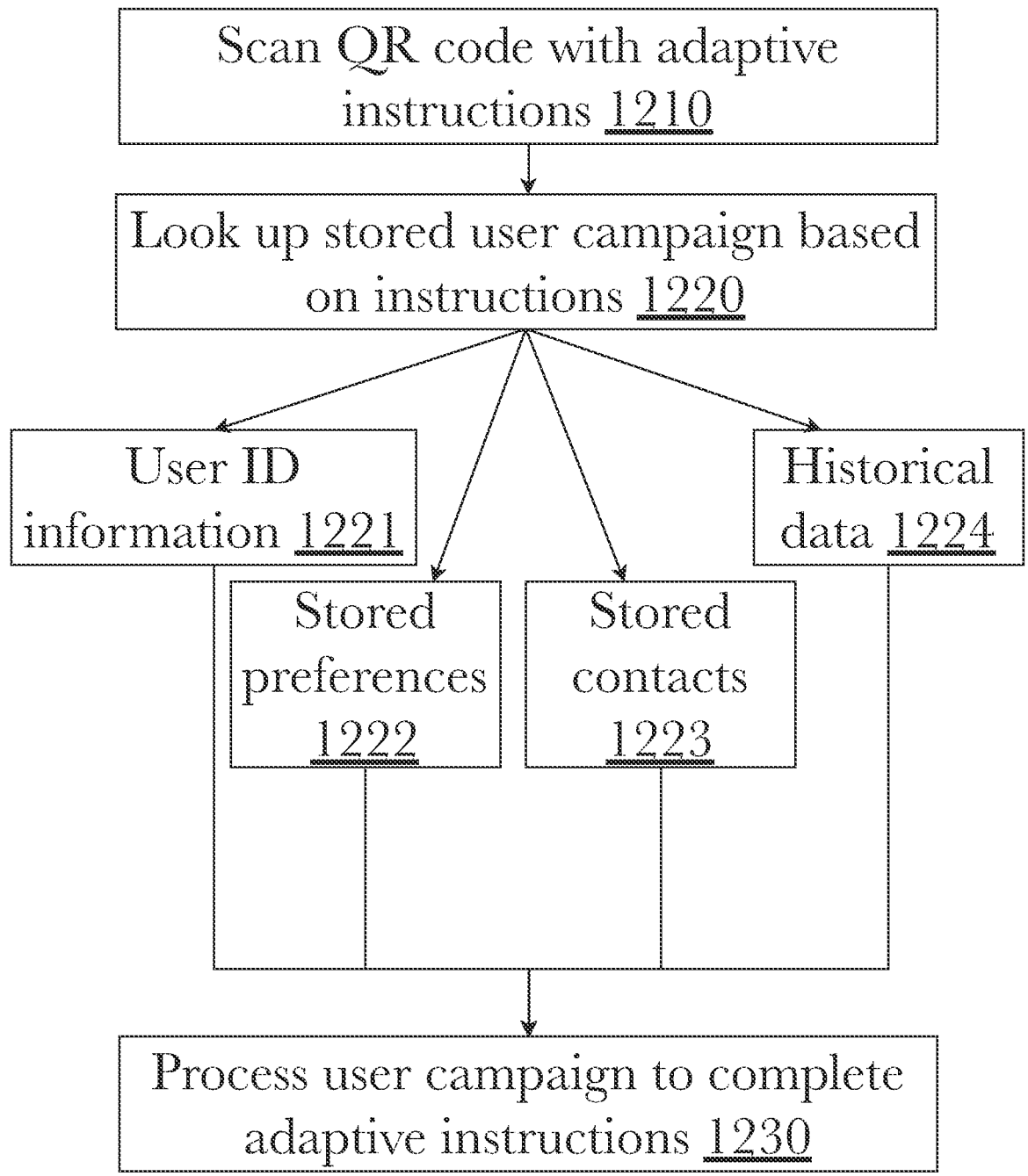
FIG. 12 is a flow diagram illustrating an exemplary method for processing adaptive instructions based on a stored user campaign.

FIG. 12 is a flow diagram illustrating an exemplary method for processing adaptive instructions based on a stored user campaign. When a QR code comprising adaptive instructions is scanned 1210, the adaptive instructions may be processed 1220 to identify a user campaign to be retrieved for providing user-specific contextual information according to the particular instructions. A user campaign may be associated with a user or device performing the scan, and may comprise a variety of stored information that may be retrieved and utilized in the processing of adaptive instructions to provide both user-specific functionality when executing adaptive instructions to perform real-time operations at the time of a scan, as well as to provide a persistent experience for the user by enabling the use of stored information that can be retrieved during scans to provide consistent inputs to any adaptive instructions and tailor the results to the particular user performing the scan. User identification information 1221 may comprise any user-specific information such as (for example, including but not limited to) name, addresses, contact information such as phone numbers or email addresses, social media accounts, photographs, or any other user-specific information that may be useful in identifying or authenticating a user, or in providing user-specific tailored experiences (for example, using a user's name in a targeted advertisement tailored to their preferences). Stored user-specific preferences may be retrieved 1222 and used as inputs or modifiers to the adaptive instructions, for example a user may store preferences regarding the handling of their contact information, or types of offers they are interested in seeing in advertisements, language preferences, or any other user-specific preferences that may govern the behavior of adaptive instructions or the outcome of a scan. Contact information 1223 may be retrieved such as specific contacts that a user has stored for various purposes, such as preferred or emergency contacts, as well as any contact-related preferences such as a user's preference for a particular communication channel (such as preferring email over a phone call, for example) or do-not-disturb information such as times when certain contacts should not be called or certain phone numbers are not in operation. Historical data 1224 may also be stored in a user campaign, either manually or automatically as part of a scan, comprising such information as previous scans or their results, offers previously viewed or accepted, locations at which a user has performed previous scans, or recent interactions with particular contacts, brands, vendors, or other entities. When any pertinent user campaign data has been retrieved, it may then be used to complete the context-based processing of the adaptive instructions 1230. In this manner, a user can define and curate data that they wish to be used in the processing of their scans, giving the user control over the information and the execution of context-enhanced adaptive instructions according to their wishes.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
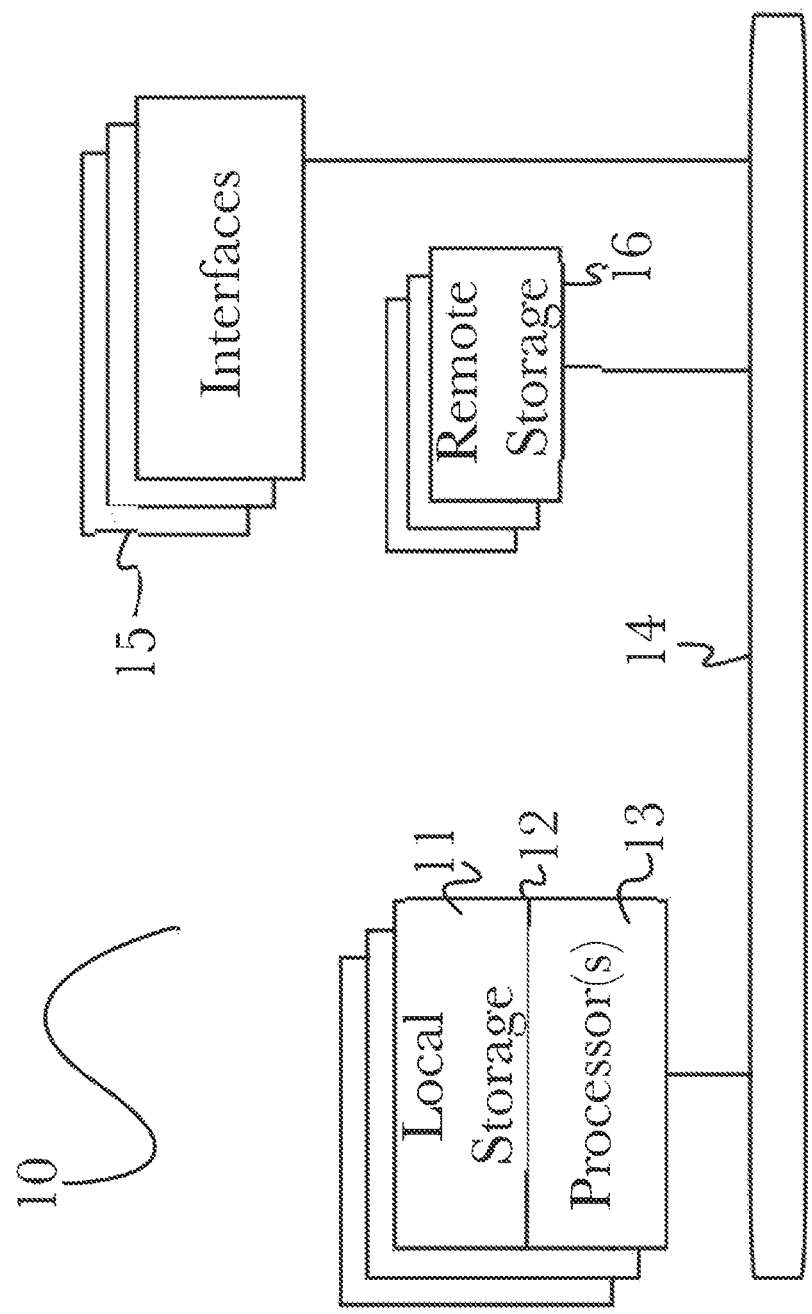
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 13 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
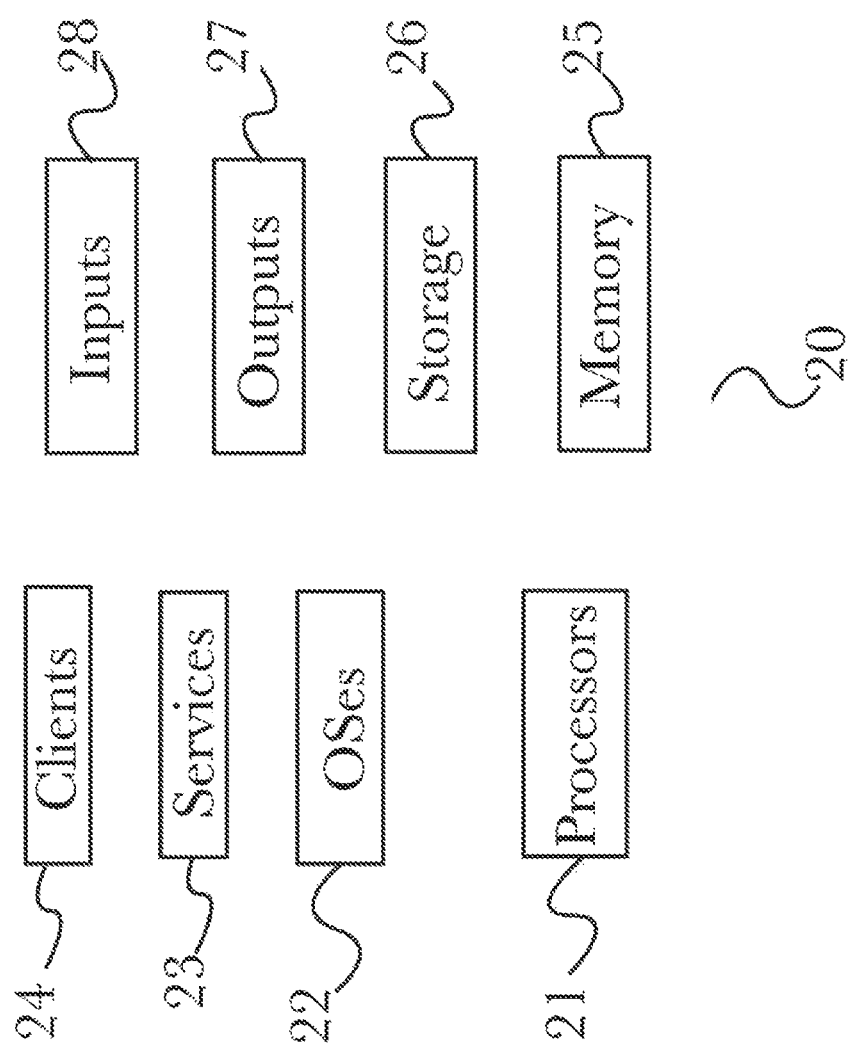
FIG. 14 is a block diagram illustrating an exemplary logical architecture for a client device.

In some embodiments, systems may be implemented on a standalone computing system. Referring now to FIG. 14, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13).

Examples of storage devices 26 include flash memory, magnetic hard drive, CD-ROM, and/or the like.

Figure 15:
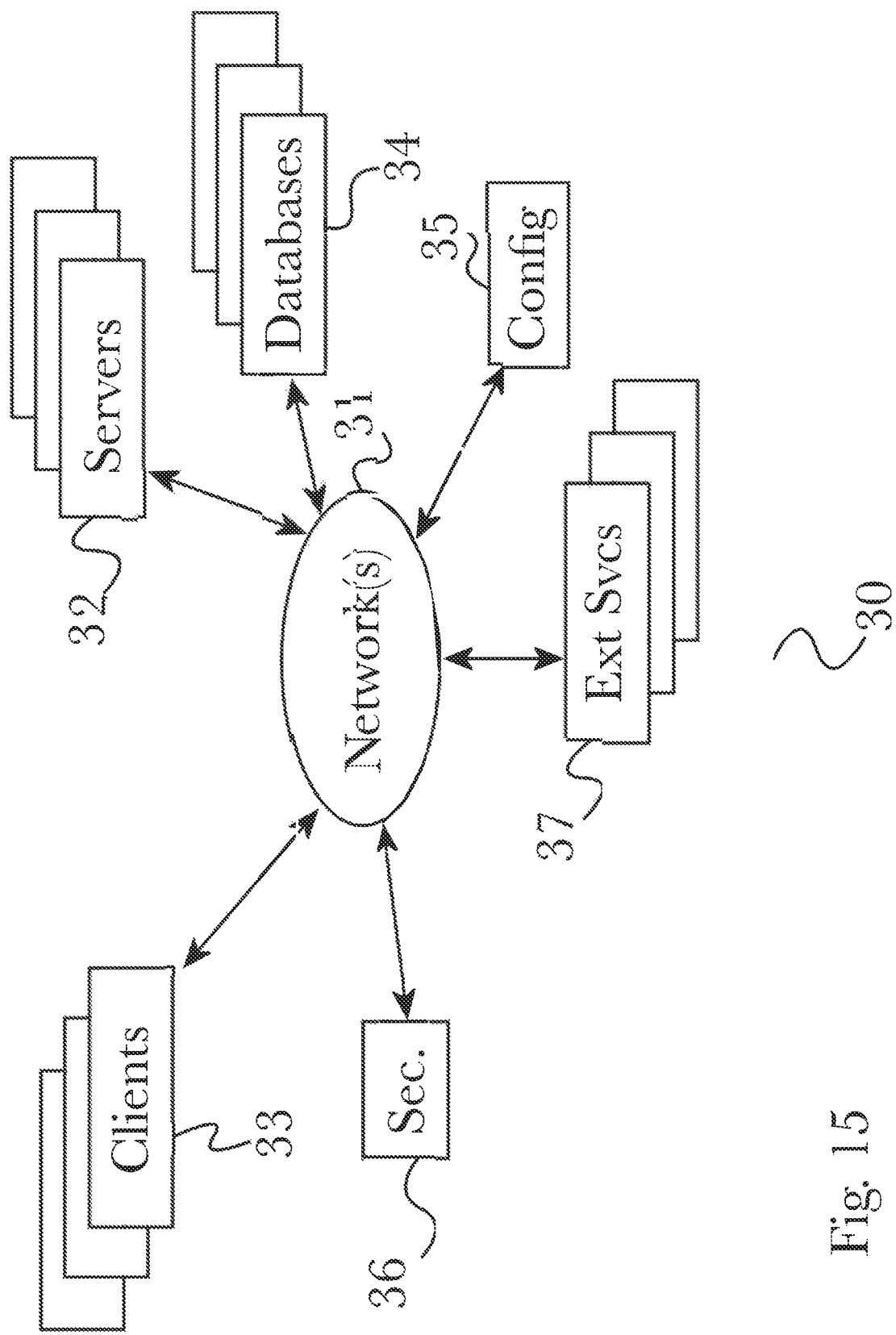
FIG. 15 is a block diagram showing an exemplary architectural arrangement of clients, servers, and external services.

In some embodiments, systems may be implemented on a distributed computing network, such as one having any number of clients and/or servers. Referring now to FIG. 15, there is shown a block diagram depicting an exemplary architecture 30 for implementing at least a portion of a system on a distributed computing network. According to the embodiment, any number of clients 33 may be provided. Each client 33 may run software for implementing client-side portions; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art. Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a SQL, while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific embodiment.

Figure 16:
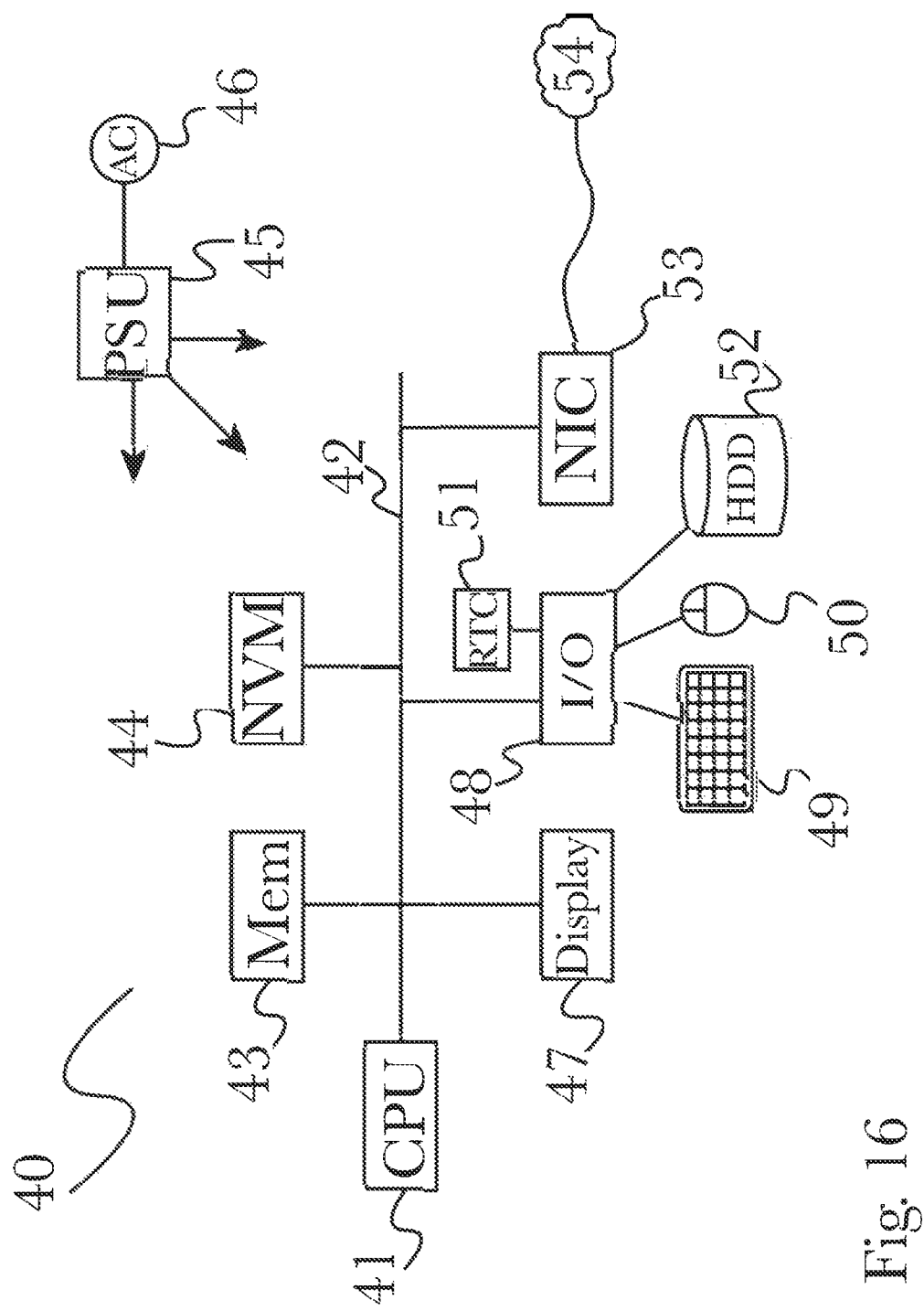
FIG. 16 is another block diagram illustrating an exemplary hardware architecture of a computing device.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods may be distributed among any number of client and/or server components. For example, various software modules may be implemented for performing various functions in connection with the various embodiments, and such modules may be variously implemented to run on server and/or client components.

The skilled person will be aware of a range of possible modifications of the various embodiments described above. Accordingly, the present invention is defined by the claims and their equivalents.

What is claimed is:

1. A system for real-time omnichannel interaction, comprising:
   an omnichannel text-based communicator comprising a first plurality of programming instructions stored in a memory of, and operating on a processor of, a first computing device, wherein the first programming instructions, when operating on the processor, cause the first computing device to:
   receive a product identifier from a customer computing device;
   collect real-time interaction data from the customer computing device, the interaction data comprising at least one of: time of access, device hardware information, device software information, sensor data, or location data;
generate a tap text link associated with the product, the tap text link comprising a ready-to-send text message directed to a phone number associated with an advertisement campaign, wherein the tap text link is dynamically constructed at the time of receipt based at least in part on the real-time interaction data collected from the customer computing device;
send the generated tap text link to the customer computing device;
receive a text message from the customer computing device, the text message corresponding to the tap text link; and
send a multimedia message comprising an active call-to-action component comprising activation metadata to the customer computing device.

2. The system of claim 1, wherein a unique identification number associated with the customer computing device is masked from the business computing device.

3. The system of claim 1, wherein the tap text link is tailored to a user's time, location, and device and is generated based on contextual information that is collected at the time of generation.

4. The system of claim 3, wherein the contextual information comprises at least one of user information, device hardware information, device software information, date, time, location, sensor data, or information retrieved from a stored user campaign.

5. The system of claim 4, wherein the stored user campaign comprises at least one of user preference information, contact information, or historical information.

6. The system of claim 5, wherein the stored user campaign is stored on a database and retrieved over a network.

7. The system of claim 5, wherein the stored user campaign is stored on the user computing device.

8. The system of claim 3, wherein the contextual information is received from the customer computing device.

9. A method for real-time omnichannel interaction, comprising the steps of:
receiving a product identifier from a customer computing device;
collecting real-time interaction data from the customer computing device, the interaction data comprising at least one of: time of access, device hardware information, device software information, sensor data, or location data;
generating a tap text link associated with the product, the tap text link comprising a ready-to-send text message directed to a phone number associated with an advertisement campaign, wherein the tap text link is dynamically constructed at the time of receipt based at least in part on the real-time interaction data collected from the customer computing device;
sending a multimedia message comprising an active call-to-action component comprising activation metadata to the customer computing device; and
receiving a text message from the customer computing device, the text message corresponding to the tap text link.

10. The method of claim 9, wherein a unique identification number associated with the customer computing device is masked from the business computing device.

11. The method of claim 9, wherein the tap text link is tailored to a user's time, location, and device and is generated based on contextual information that is collected at the time of generation.

12. The method of claim 11, wherein the contextual information comprises at least one of user information, device hardware information, device software information, date, time, location, sensor data, or information retrieved from a stored user campaign.

13. The method of claim 12, wherein the stored user campaign comprises at least one of user preference information, contact information, or historical information.

14. The method of claim 13, wherein the stored user campaign is stored on a database and retrieved over a network.

15. The method of claim 13, wherein the stored user campaign is stored on the user computing device.

16. The method of claim 11, wherein the contextual information is received from the customer computing device.

* * * * *